(12) United States Patent
Niwa et al.

(10) Patent No.: US 11,327,224 B2
(45) Date of Patent: May 10, 2022

(54) DISPLAY DEVICE AND OPTICAL DEVICE

(71) Applicant: Sony Group Corporation, Tokyo (JP)

(72) Inventors: Hayato Niwa, Tokyo (JP); Soya Araki, Kanagawa (JP); Takeshi Yamamoto, Tokyo (JP)

(73) Assignee: Sony Group Corporation

( * ) Notice: Subject to any disclaimer, the term of this patent is extended or adjusted under 35 U.S.C. 154(b) by 0 days.

(21) Appl. No.: 16/963,919

(22) PCT Filed: Dec. 17, 2018

(86) PCT No.: PCT/JP2018/046272
§ 371 (c)(1),
(2) Date: Jul. 22, 2020

(87) PCT Pub. No.: WO2019/150794
PCT Pub. Date: Aug. 8, 2019

(65) Prior Publication Data
US 2021/0041624 A1 Feb. 11, 2021

(30) Foreign Application Priority Data

Jan. 31, 2018 (JP) .............................. JP2018-015875

(51) Int. Cl.
*G02B 6/08* (2006.01)
(52) U.S. Cl.
CPC ....................................... *G02B 6/08* (2013.01)
(58) Field of Classification Search
None
See application file for complete search history.

(56) References Cited

U.S. PATENT DOCUMENTS

| 5,923,806 | A | 7/1999 | Sugawara |
| 2006/0007054 | A1 | 1/2006 | Chang et al. |
| 2011/0025594 | A1 | 2/2011 | Watanabe |
| 2011/0102302 | A1 | 5/2011 | Watanabe et al. |
| 2011/0255301 | A1 | 10/2011 | Watanabe |
| 2012/0069273 | A1 | 3/2012 | Watanabe |

(Continued)

FOREIGN PATENT DOCUMENTS

| CN | 101965604 A | 2/2011 |
| CN | 102402903 A | 4/2012 |

(Continued)

OTHER PUBLICATIONS

International Search Report for PCT/JP2018/046272 dated Mar. 5, 2019; 3 pages.

*Primary Examiner* — Jerry Rahll
(74) *Attorney, Agent, or Firm* — Lerner, David, Littenberg, Krumholz & Mentlik, LLP

(57) ABSTRACT

There is provided a display device that is able to display a favorable image. This display device includes: a display section including a display surface that emits image light; a light guide member in which a plurality of optical fibers each including a core part and a cladding part are bundled and integrated, in which the core part guides the image light from an incident surface facing the display surface to an emission surface positioned opposite to the incident surface, and the cladding part surrounds the core part; and a first optical member provided on side opposite to the display section as viewed from the light guide member, in which the first optical member converts light distribution of the image light emitted from the emission surface.

6 Claims, 17 Drawing Sheets

(56) References Cited

U.S. PATENT DOCUMENTS

| | | | |
|---|---|---|---|
| 2014/0218960 A1 | 8/2014 | Wu | |
| 2015/0091833 A1 | 4/2015 | Wu | |
| 2017/0371201 A1 | 12/2017 | Yang et al. | |
| 2017/0371612 A1 | 12/2017 | Chin et al. | |

FOREIGN PATENT DOCUMENTS

| | | | |
|---|---|---|---|
| CN | 102610168 A | 7/2012 | |
| CN | 107545853 A | 1/2018 | |
| JP | 2009198688 A | 9/2009 | |
| JP | 2014119562 A | 6/2014 | |
| TW | 201512925 A | 4/2015 | |
| WO | 2010055671 A1 | 5/2010 | |
| WO | 2010140537 A1 | 12/2010 | |

[FIG. 1A]
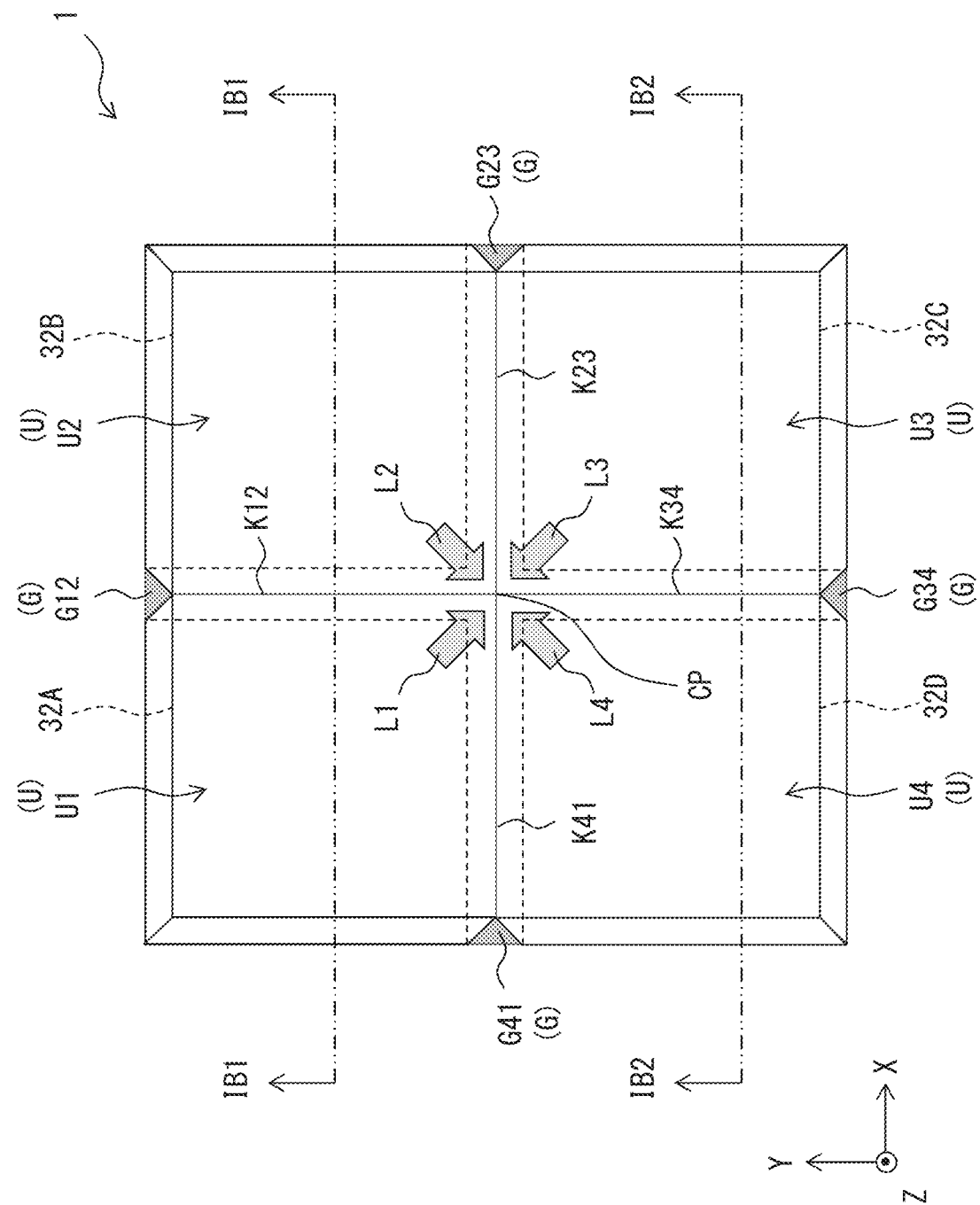

[FIG. 1B]
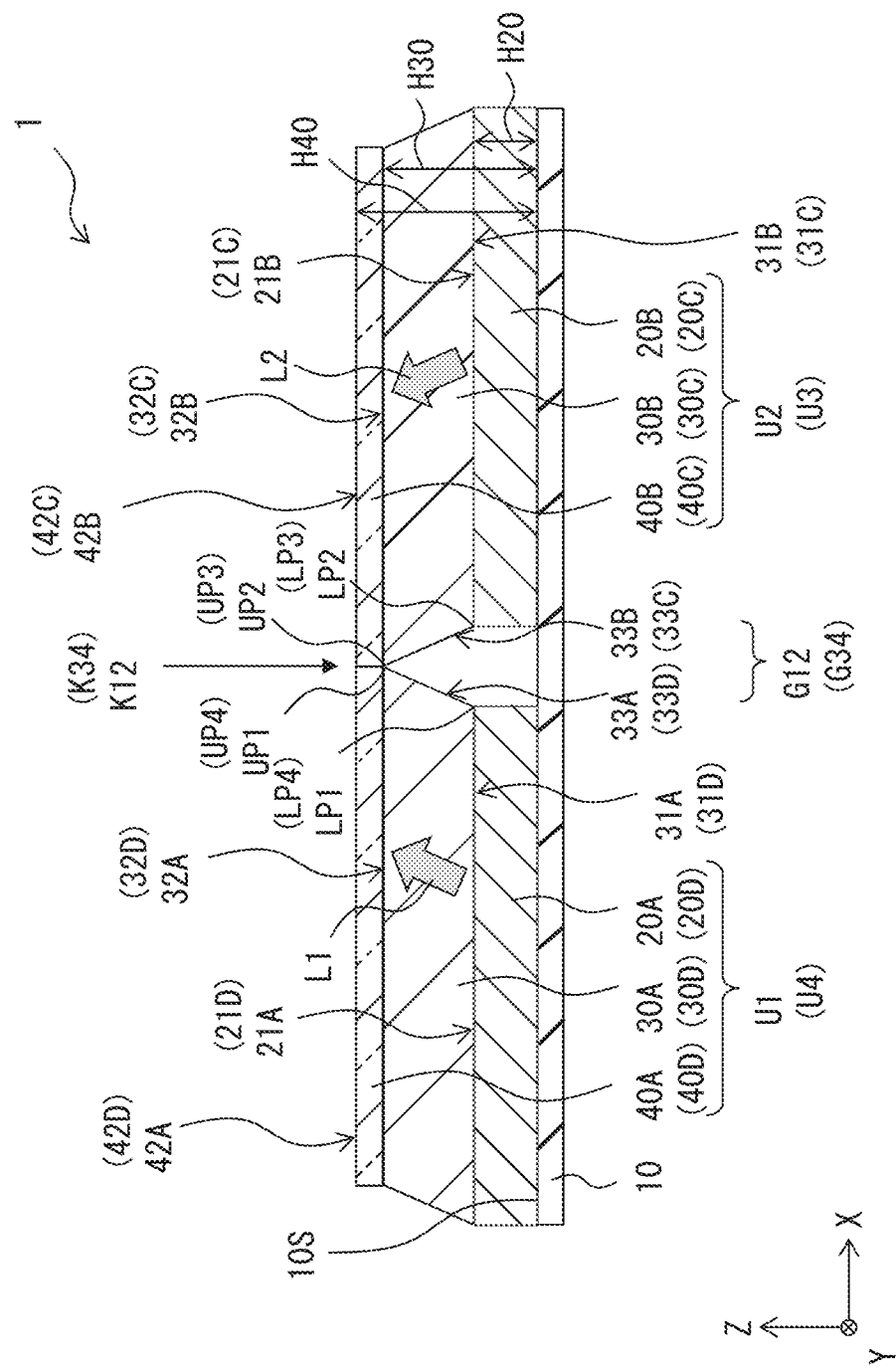

[ FIG. 2A ]
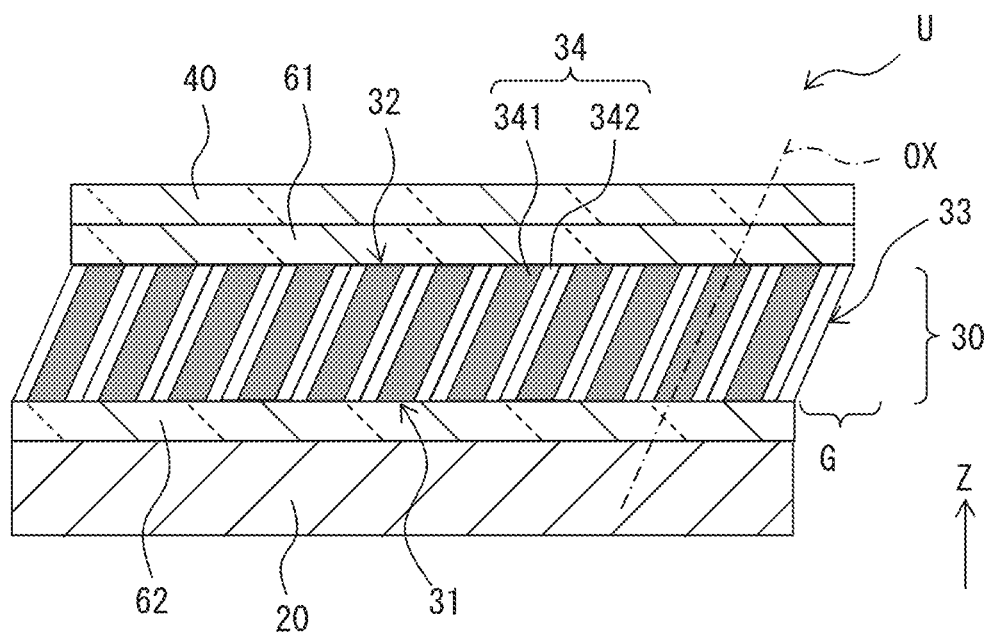
[ FIG. 2B ]
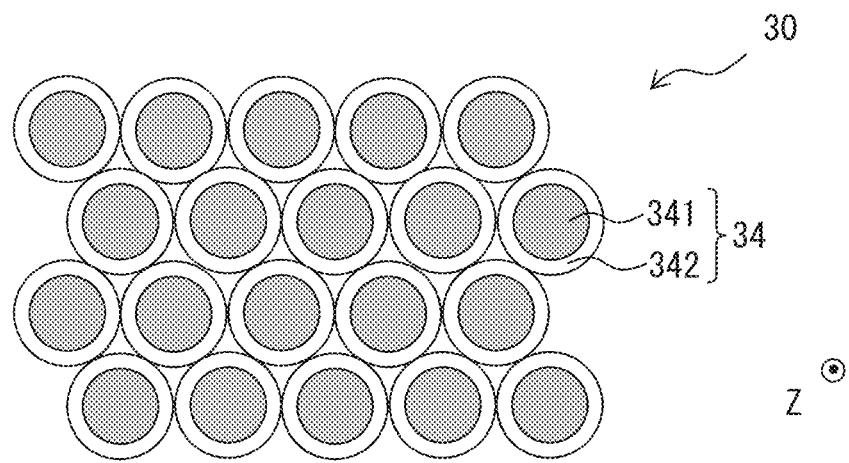

[ FIG. 3A ]
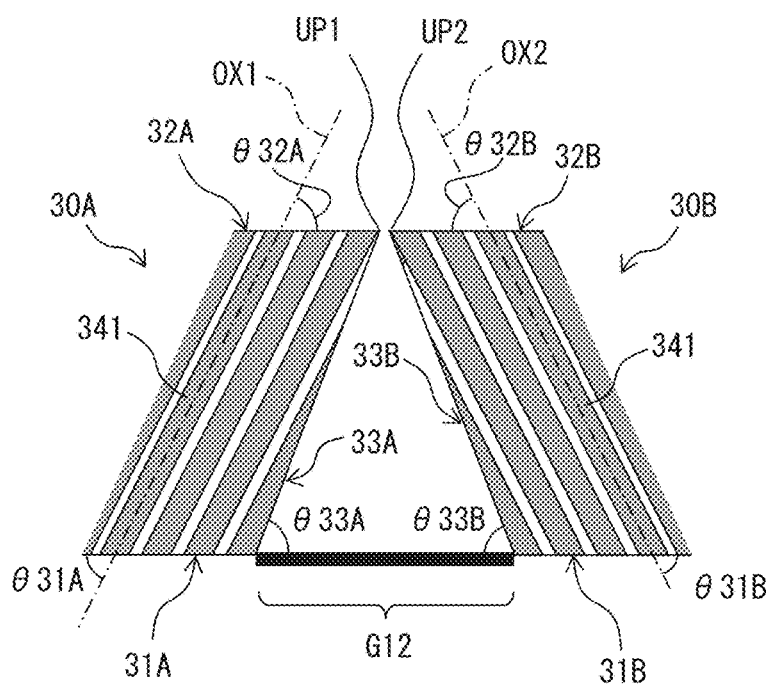
[ FIG. 3B ]
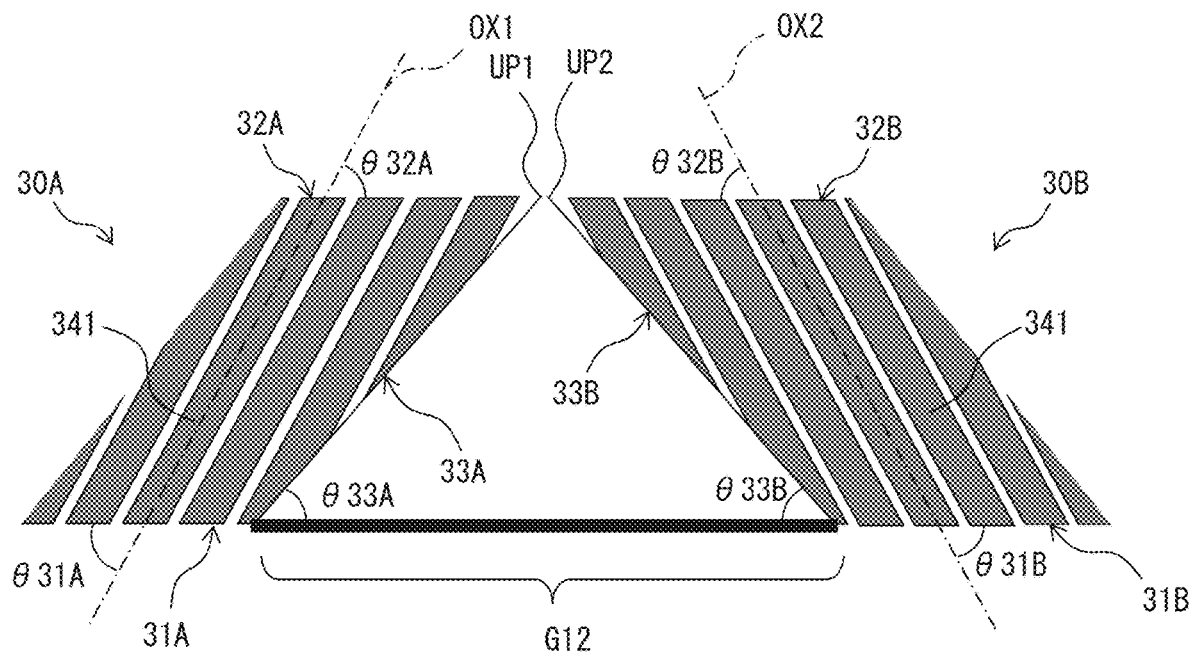

[ FIG. 4 ]
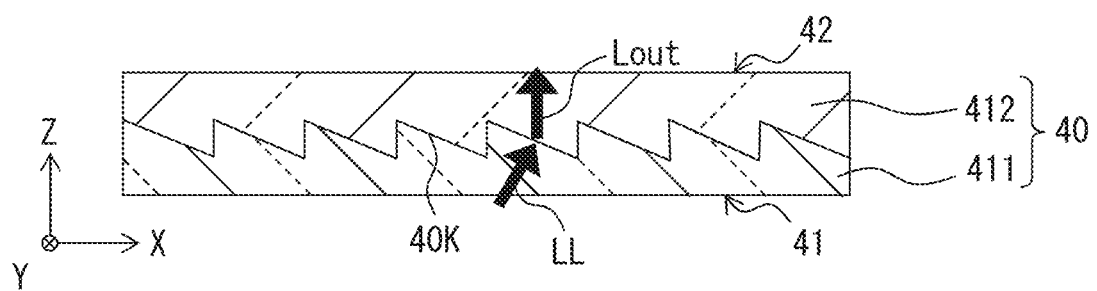

[FIG. 5A]
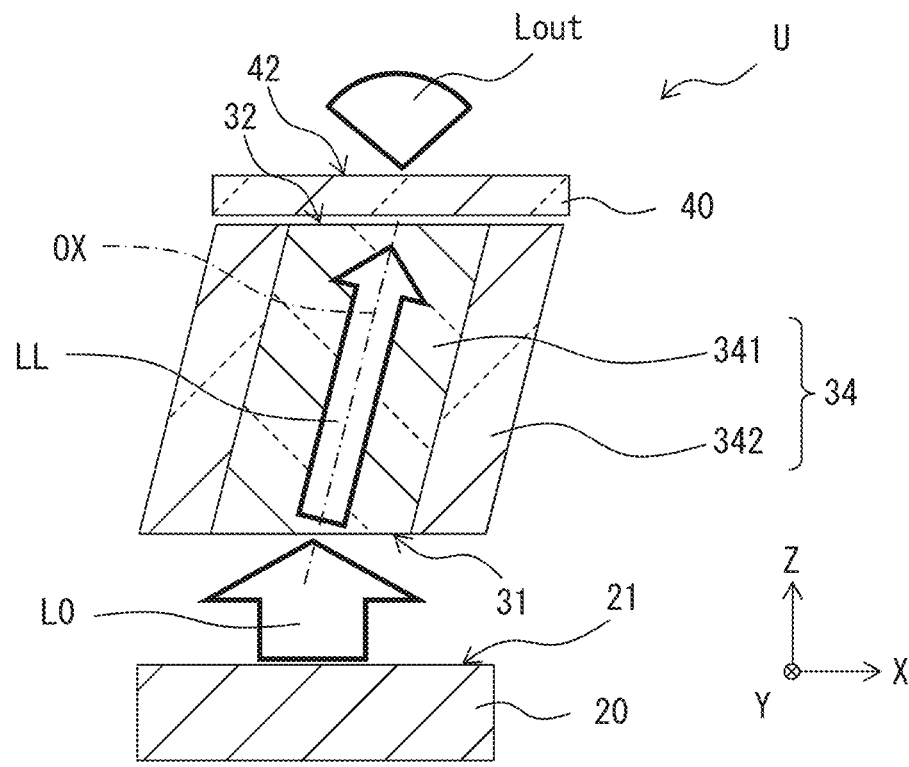
[FIG. 5B]
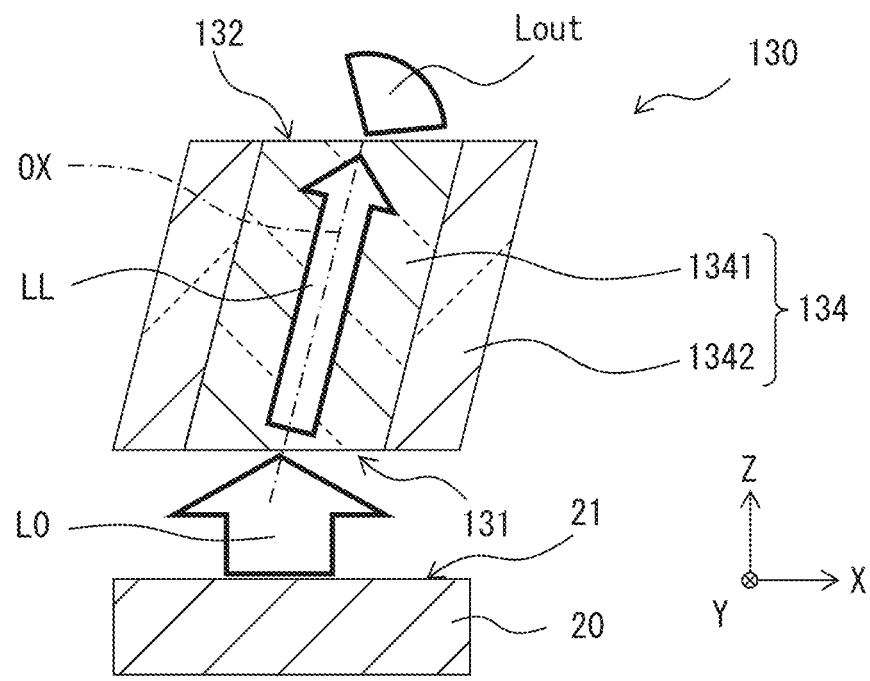

[FIG. 6]
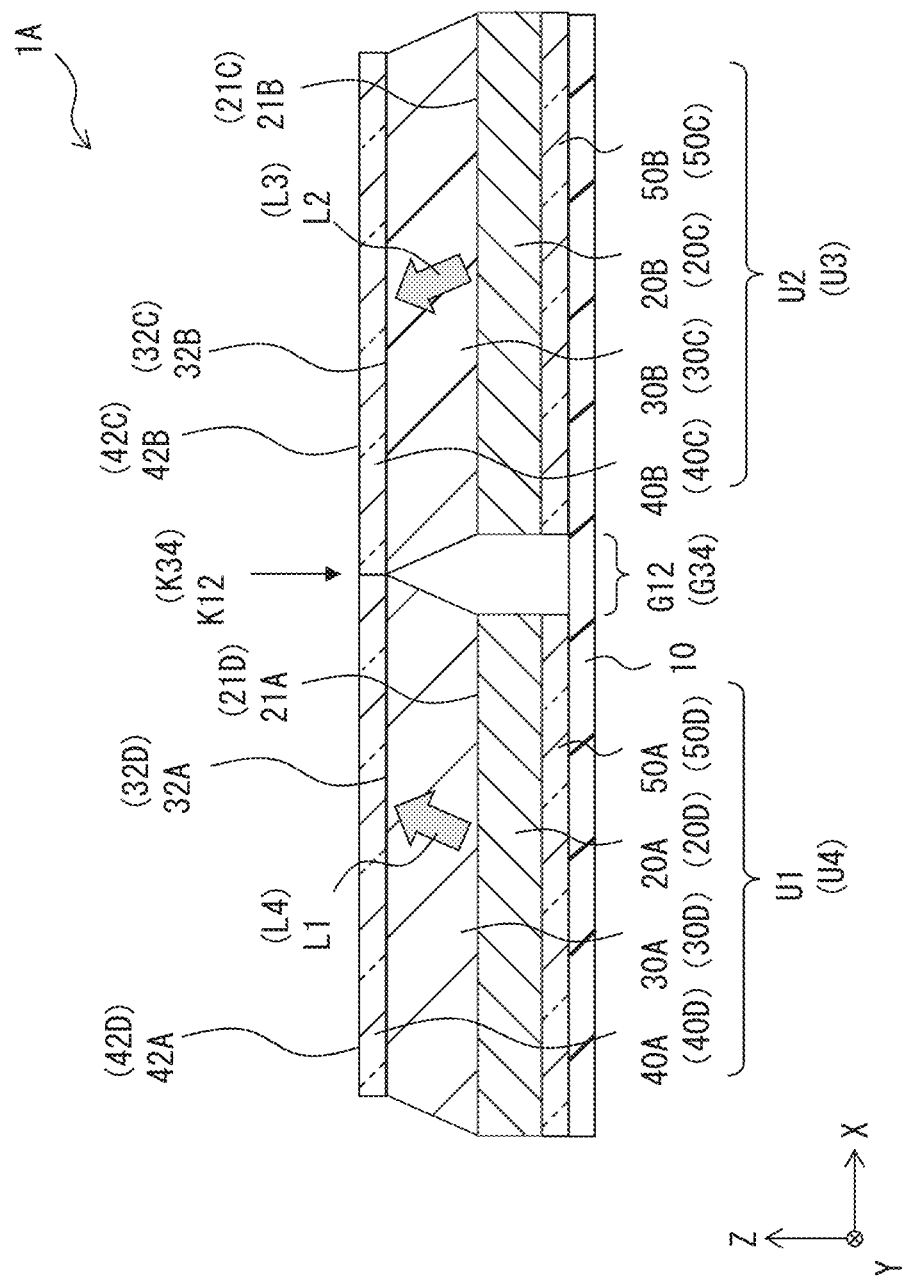

[ FIG. 7 ]
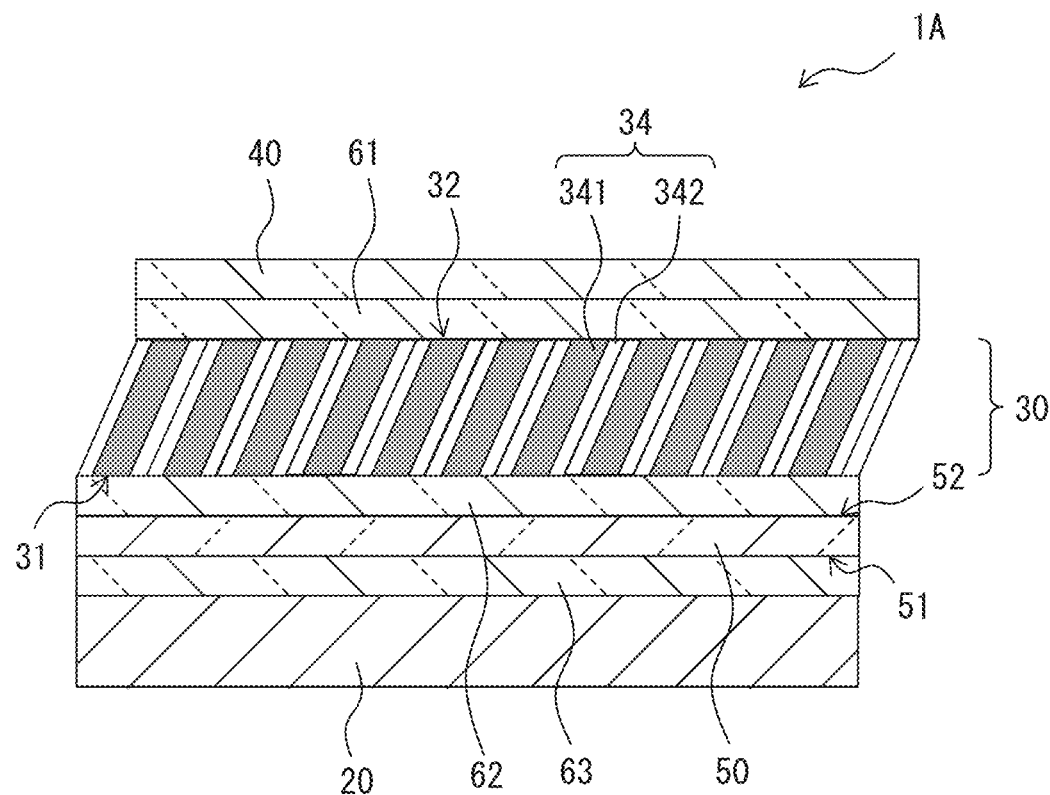
[ FIG. 8 ]
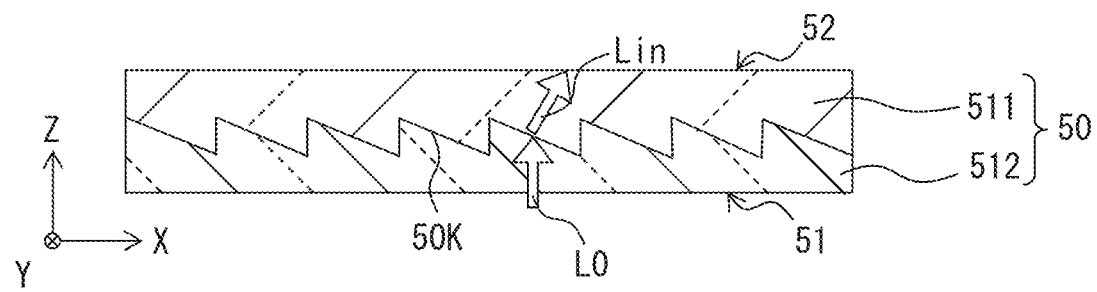

[ FIG. 9 ]
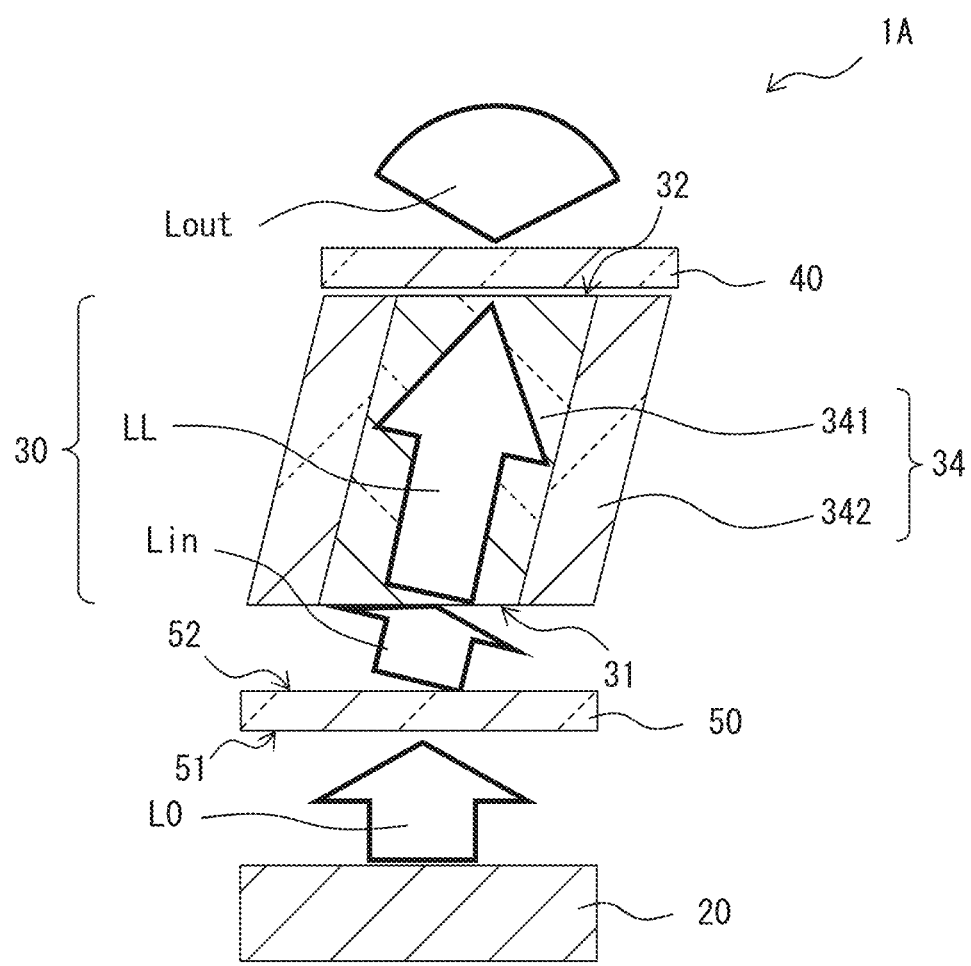

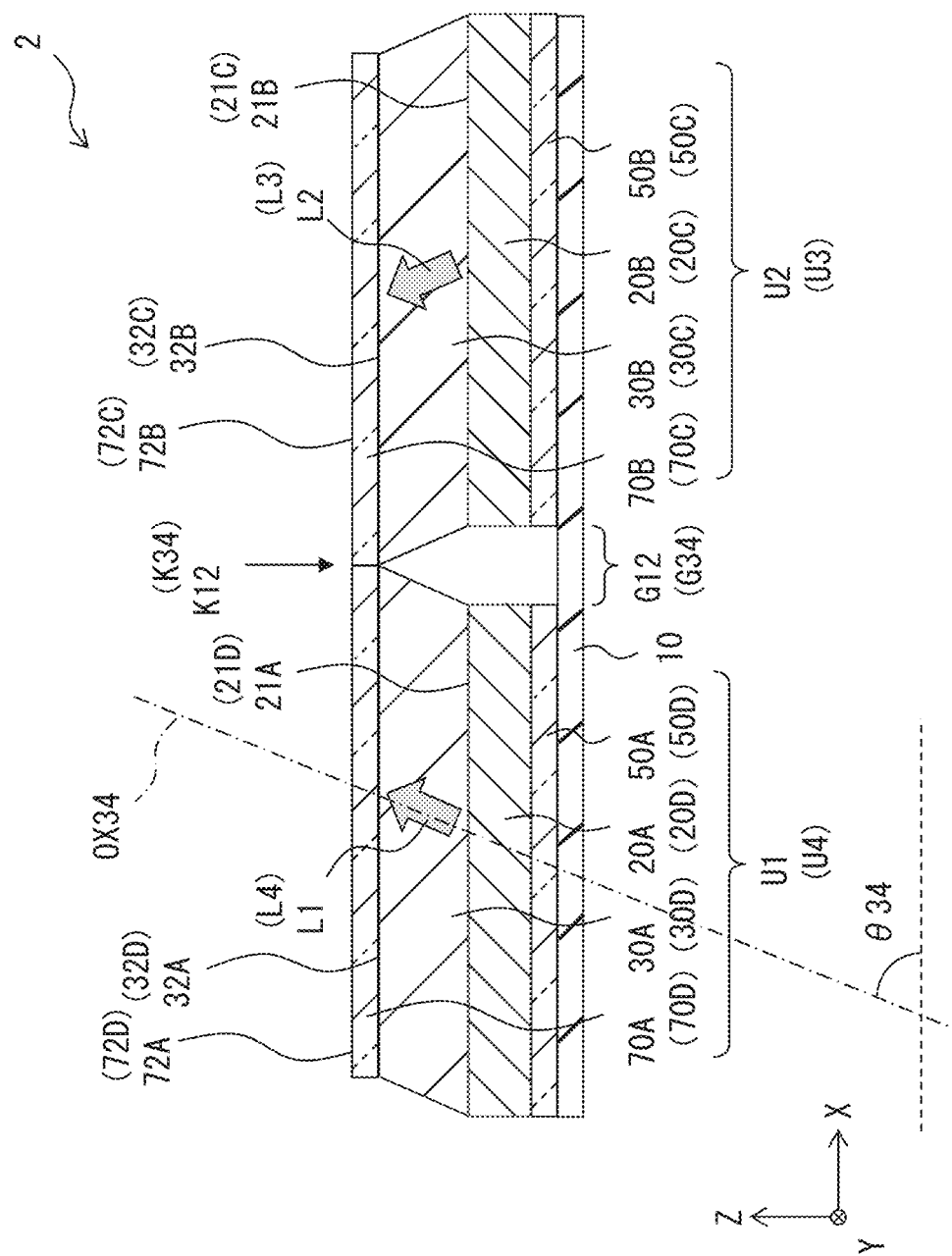
[FIG. 10]

[FIG. 11]
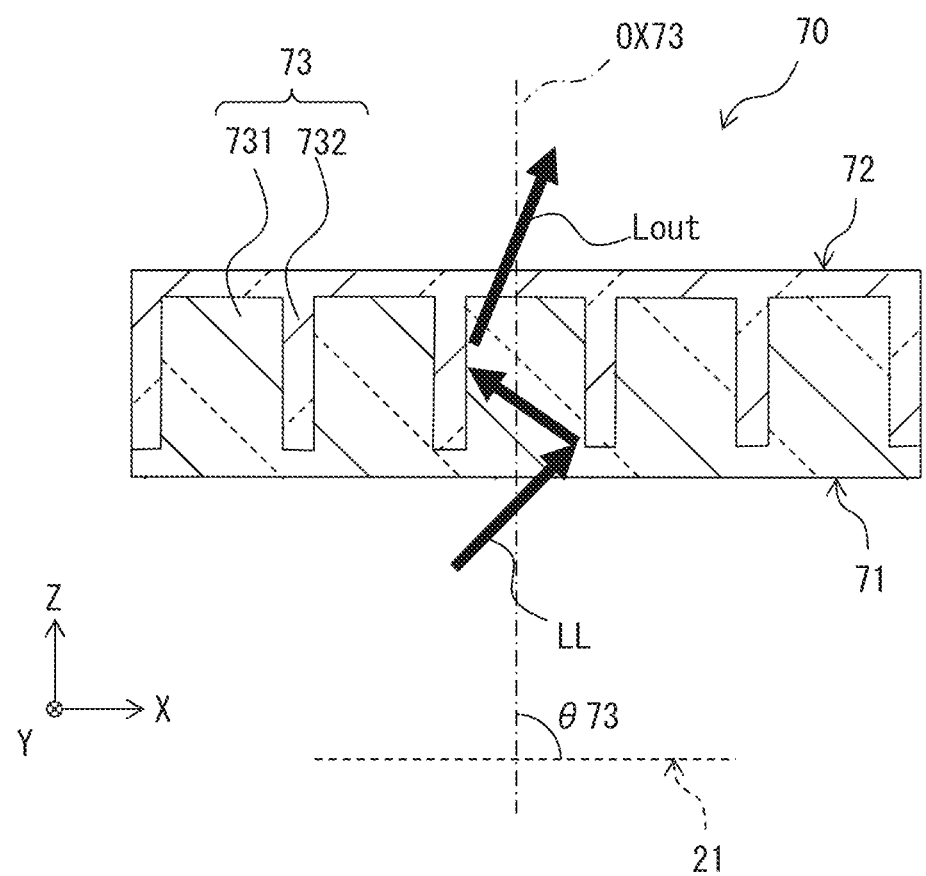

[FIG. 12A]
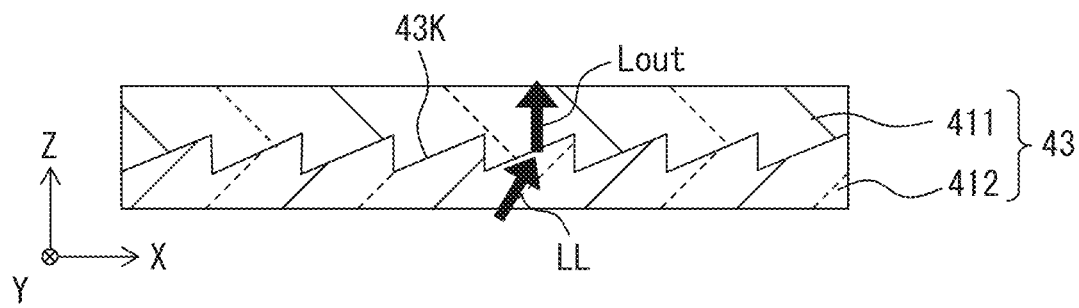
[FIG. 12B]
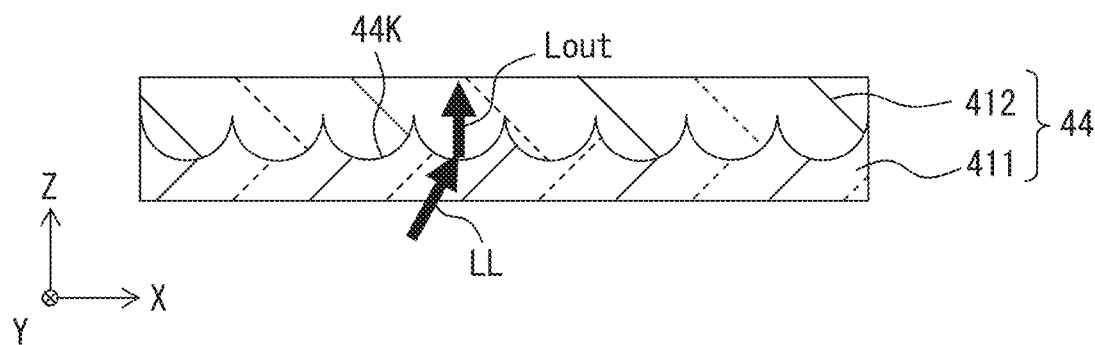
[FIG. 12C]
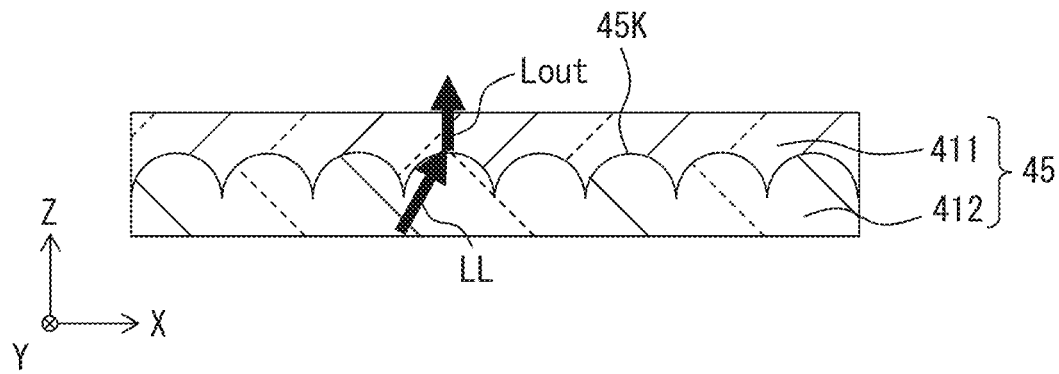

[FIG. 13]
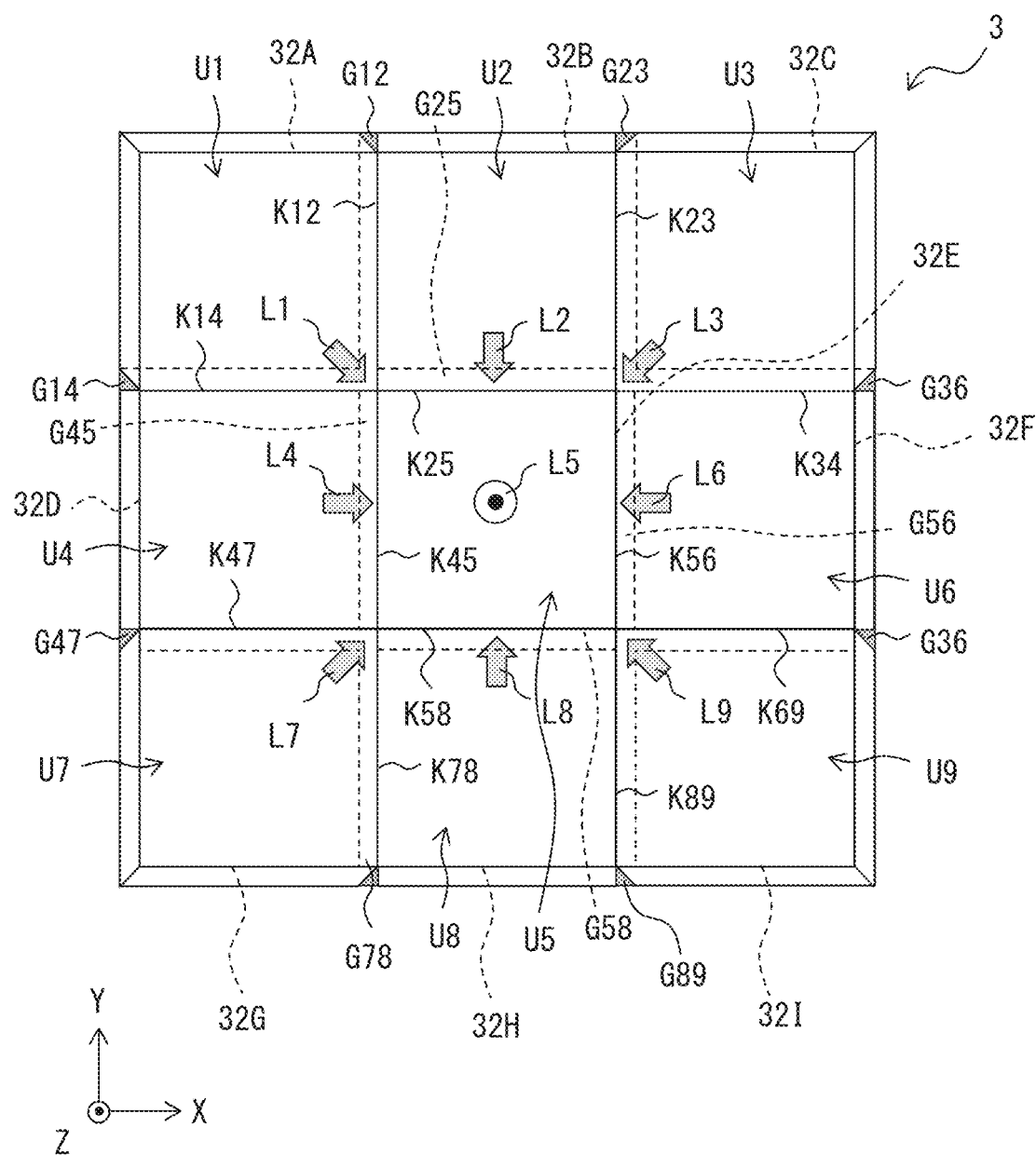

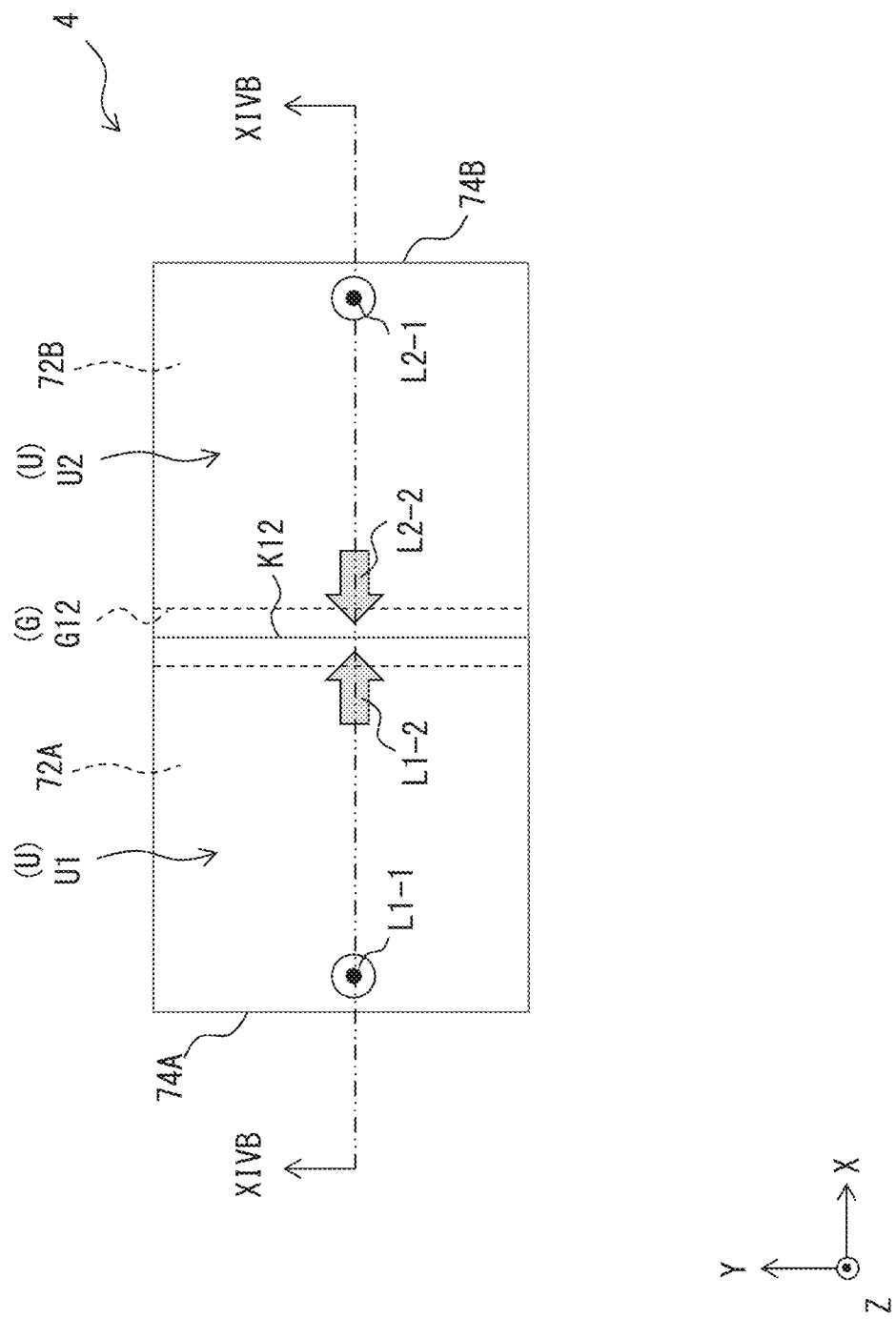
[FIG. 14A]

[ FIG. 14B ]
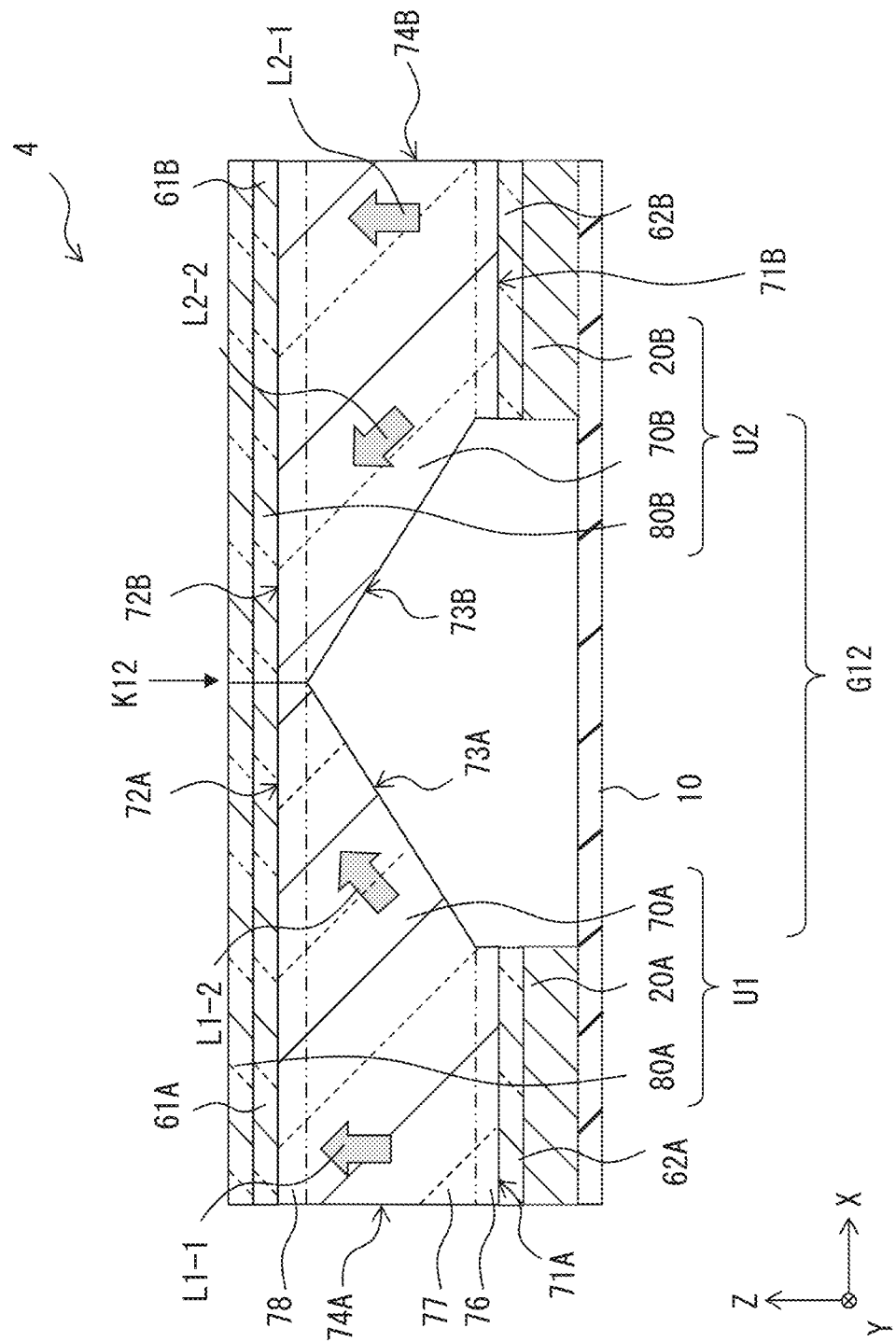

[ FIG. 14C ]
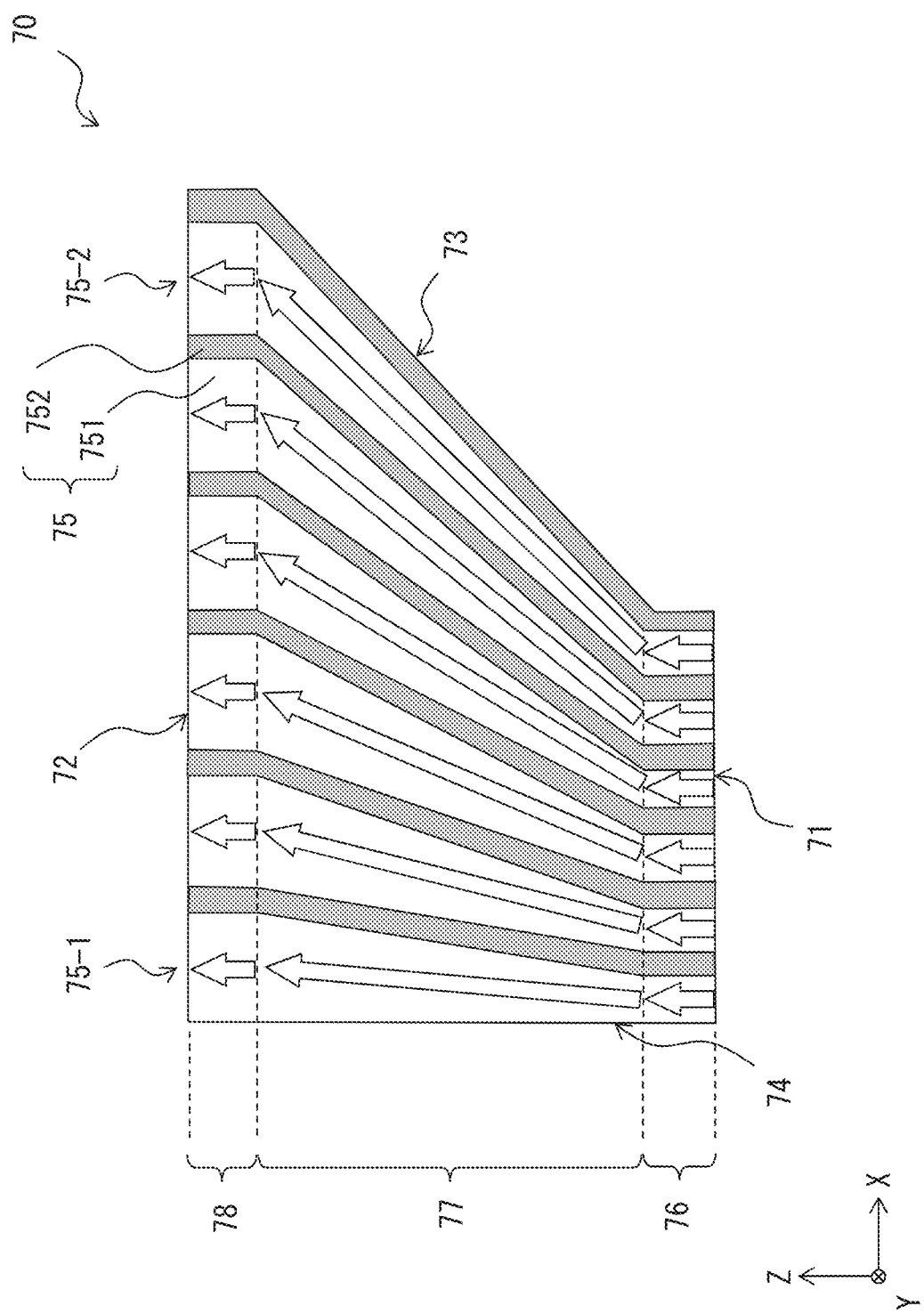

[FIG. 15]
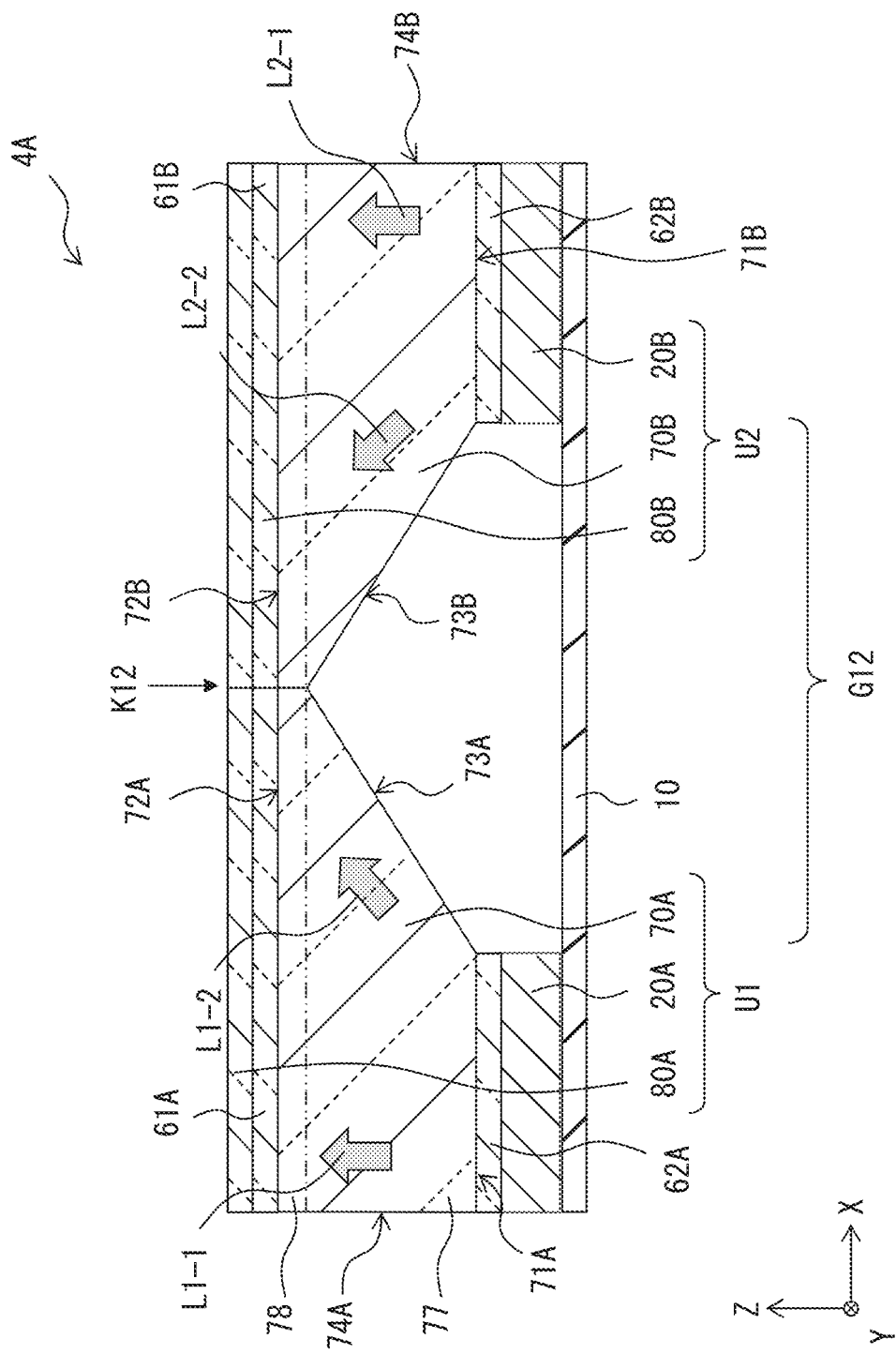

DISPLAY DEVICE AND OPTICAL DEVICE

CROSS-REFERENCE TO RELATED APPLICATIONS

This application is a national phase entry under 35 U.S.C. § 371 of International Application No. PCT/JP2018/046272 filed Dec. 17, 2018, which claims the priority from Japanese Patent Application No. 2018-015875 filed in the Japanese Patent Office on Jan. 31, 2018, the entire contents of which are hereby incorporated by reference.

TECHNICAL FIELD

The present disclosure relates to a display device and an optical device to be applied to the display device.

BACKGROUND ART

Heretofore, a large-sized multi-display has been proposed which is configured by arranging a plurality of display panels (e.g., PTL 1).

CITATION LIST

Patent Literature

PTL 1: Japanese Unexamined Patent Application Publication No. 2014-119562

SUMMARY OF THE INVENTION

In such a multi-display, a boundary part between a plurality of display panels arranged side by side is often visually recognized as a dark line.

It is thus desired to provide a display device that is able to display a favorable image in which a dark line is less likely to be visually recognized by a viewer, and an optical device suitable for the display device.

A first display device as an embodiment of the present disclosure includes: a display section including a display surface that emits image light; a light guide member in which a plurality of optical fibers each including a core part and a cladding part are bundled and integrated, in which the core part guides the image light from an incident surface facing the display surface to an emission surface positioned opposite to the incident surface, and the cladding part surrounds the core part; and a first optical member provided on side opposite to the display section as viewed from the light guide member, in which the first optical member converts light distribution of the image light emitted from the emission surface.

A second display device as an embodiment of the present disclosure includes: a display section including a display surface that emits image light; a first light guide member in which a plurality of first optical fibers each including a first core part and a first cladding part are bundled and integrated, in which the first core part guides the image light from a first incident surface facing the display surface to a first emission surface positioned opposite to the first incident surface, and the first cladding part surrounds the first core part; and a second light guide member which is disposed on side opposite to the display section as viewed from the first light guide member, and in which a plurality of second optical fibers each including a second core part and a second cladding part are bundled and integrated, in which the second core part guides the image light from a second incident surface facing the first emission surface to a second emission surface positioned opposite to the second incident surface, and the second cladding part surrounds the second core part. Here, a first optical axis in the first optical fiber forms a first angle larger than 0° and less than 90° relative to the display surface, and a second optical axis in the second optical fiber forms a second angle larger than the first angle and equal to or less than 90° relative to the display surface.

An optical device as an embodiment of the present disclosure includes: a light guide member in which a plurality of optical fibers each including a core part and a cladding part are bundled and integrated, in which the core part guides external light from an incident surface on which the external light is incident to an emission surface positioned opposite to the incident surface, and the cladding part surrounds the core part; and a first optical member disposed to face the emission surface in the light guide member, in which the first optical member converts light distribution of the external light emitted from emission surface.

According to the display device of an embodiment of the present disclosure, it is possible to display a favorable image in which a dark line is less likely to be visually recognized by a viewer. In addition, it is possible to use the optical device of an embodiment of the present disclosure for the above-described display device.

It is to be noted that the effects of the present disclosure are not limited thereto, and may be any of the effects described below.

BRIEF DESCRIPTION OF THE DRAWINGS

FIG. 1A is a front view of an overall configuration example of a display device according to a first embodiment of the present disclosure.

FIG. 1B is a cross-sectional view of a configuration of the display device illustrated in FIG. 1A.

FIG. 2A is an enlarged cross-sectional view of a main part of the display device illustrated in FIG. 1A.

FIG. 2B is an enlarged plan view of a main part of a fiber optical plate illustrated in FIG. 1A.

FIG. 3A is an enlarged cross-sectional view of a vicinity of side surfaces of the fiber optical plate illustrated in FIG. 2B.

FIG. 3B is another enlarged cross-sectional view of the vicinity of the side surfaces of the fiber optical plate illustrated in FIG. 2B.

FIG. 4 is an enlarged cross-sectional view of a main part of a first optical member illustrated in FIG. 2A.

FIG. 5A is a conceptual diagram describing a state of propagation of image light in the display device illustrated in FIG. 1A.

FIG. 5B is a conceptual diagram illustrating a state of propagation of image light in a display device as a reference example.

FIG. 6 is a cross-sectional view of an overall configuration example of a display device as a first modification example of the present disclosure.

FIG. 7 is an enlarged cross-sectional view of a main part of the display device illustrated in FIG. 6.

FIG. 8 is an enlarged cross-sectional view of a main part of a second optical member illustrated in FIG. 6.

FIG. 9 is a conceptual diagram describing a state of propagation of image light in the display device illustrated in FIG. 6.

FIG. 10 is a cross-sectional view of an overall configuration example of a display device according to a second embodiment of the present disclosure.

FIG. 11 is an enlarged cross-sectional view of a main part of a fiber optical plate as a second light guide member illustrated in FIG. 10.

FIG. 12A is an enlarged cross-sectional view of a main part of a first optical member as a second modification example of the present disclosure.

FIG. 12B is an enlarged cross-sectional view of a main part of a first optical member as a third modification example of the present disclosure.

FIG. 12C is an enlarged cross-sectional view of a main part of a first optical member as a fourth modification example of the present disclosure.

FIG. 13 is a front view of an overall configuration example of a display device as a fifth modification example of the present disclosure.

FIG. 14A is a front view of an overall configuration example of a display device as a sixth modification example of the present disclosure.

FIG. 14B is a cross-sectional view of a configuration of the display device illustrated in FIG. 14A.

FIG. 14C is an enlarged cross-sectional view of a main part of the display device illustrated in FIG. 14A.

FIG. 15 is a cross-sectional view of a configuration example of a display device as a seventh modification example of the present disclosure.

MODES FOR CARRYING OUT THE INVENTION

Hereinafter, description is given in detail of embodiments of the present disclosure with reference to the drawings. It is to be noted that description is given in the following order.
1. First Embodiment
An example of a display device in which a plurality of display units are arranged, which each include, in order, a display panel, a fiber optical plate having an optical axis inclined relative to a display surface of the display panel, and an optical film.
2. Modification Example of First Embodiment
An example in which a display unit further includes another optical film between a display panel and a fiber optical plate.
3. Second Embodiment
An example of a display device in which a fiber optical plate having an optical axis inclined relative to a display surface of a display panel and a fiber optical plate having an optical axis orthogonal relative to the display surface of the display panel are mixedly present.
4. Other Modification Examples 1. First Embodiment

[Configuration of Display Device 1]
FIGS. 1A and 1B each schematically illustrate an overall configuration example of a display device 1 as an embodiment of the present disclosure. FIG. 1A illustrates a planar configuration of the display device 1, and FIG. 1B illustrates a cross-sectional configuration thereof. FIG. 1B corresponds to a cross-sectional view in an arrow view direction taken along each of a cutting line IB1-IB1 and a cutting line IB2-IB2 illustrated in FIG. 1A. It is to be noted that a cross-sectional structure taken along the cutting line IB1-IB1 of FIG. 1A and a cross-sectional structure taken along the cutting line IB2-IB2 of FIG. 1A are substantially the same. However, as for the component denoted by a reference numeral with parentheses, a component in the cross-sectional structure taken along the cutting line IB2-IB2 in FIG. 1A is denoted by the reference numeral with parentheses.

The display device 1 includes, for example, a single substrate 10 (illustrated in FIG. 1B) and a plurality of display units U (illustrated with parentheses in FIG. 1A) arranged on the substrate 10. The substrate 10 is formed, for example, by a highly rigid material such as metal. FIG. 1A exemplifies four display units U1 to U4 arranged in matrix; however, the present disclosure is not limited thereto.

The display units U1 to U4 include, respectively, display panels 20A to 20D as display sections, fiber optical plates 30A to 30D as light guide members, and optical films 40A to 40D as first optical members, which are stacked in order on the common substrate 10. It is to be noted that, in descriptions of the present specification and the drawings, the display units U1 to U4 may be collectively referred to as a display unit U in some cases. Similarly, in the descriptions of the specification and drawings, the display panels 20A to 20D may be collectively referred to as a display panel 20, the fiber optical plates 30A to 30D may be collectively referred to as a fiber optical plate 30, and the optical films 40A to 40D may be collectively referred to as an optical film 40, in some cases.

In the present specification, a direction in which the display panel 20A and the display panel 20B are adjacent to each other and a direction in which the display panel 20C and the display panel 20D are adjacent to each other are defined as an X-axis direction. In addition, a direction in which the display panel 20A and the display panel 20D are adjacent to each other and a direction in which the display panel 20B and the display panel 20C are adjacent to each other are defined as a Y-axis direction. Further, a direction orthogonal to both of the X-axis direction and the Y-axis direction is defined as a Z-axis direction. It is to be noted that, in the present specification, the X-axis direction is called a horizontal direction, the Y-axis direction is called a vertical direction, and the Z-axis direction is called a thickness direction, in some cases. In addition, a position in the Z-axis direction is called a height position in some cases.

(Display Panel 20)
A plurality of display panels 20 corresponds to, for example, a liquid crystal display using liquid crystal elements or an organic EL (Electroluminescence) display using organic EL elements. The display panels 20A to 20D include, respectively, display surfaces 21A to 21D from which image light beams L1 to L4 are emitted. The display panels 20A to 20D are arranged along the display surfaces 21A to 21D. It is to be noted that all of the display surfaces 21A to 21D in the display panels 20A to 20D may favorably be present at the same height position. That is, in a case where the height position of a surface 10S of the substrate 10 is set as a reference position, all of the display surfaces 21A to 21D may favorably be at a position of a height H20.

A gap G is present as a joint between the plurality of display panels 20. Specifically, there is a strip-shaped gap G12 extending in the Y-axis direction between the display panel 20A and the display panel 20B, and there is a strip-shaped gap G23 extending in the X-axis direction between the display panel 20B and the display panel 20C. Further, there is a strip-shaped gap G34 extending in the Y-axis direction between the display panel 20C and the display panel 20D, and there is a strip-shaped gap G41 extending in the X-axis direction between the display panel 20D and the display panel 20A. It is to be noted that, in the descriptions of the present specification and the drawings, these gaps G12, G23, G34, and G41 are collectively referred to as a gap G. The gap G in the display device 1 is present in a cross shape as a whole in an X-Y plane. The gap G is covered with the fiber optical plate 30 except for a portion thereof, and thus is in such a state as to be hardly recognized visually by a viewer in a case of being viewed in the Z-axis direction. Therefore, in FIG. 1A, the gap G is indicated by a broken line.

(Fiber Optical Plate 30)

The fiber optical plates 30A to 30D are arranged along the display surfaces 21A to 21D to correspond to the display panels 20A to 20D, respectively. The fiber optical plates 30A to 30D are each a plate-like member in which a plurality of optical fibers 34 are bundled and integrated, and include incident surfaces 31A to 31D, emission surfaces 32A to 32D, and side surfaces 33A to 33D, respectively. In the descriptions of the present specification and the drawings, the incident surfaces 31A to 31D may be collectively referred to as an incident surface 31, the emission surfaces 32A to 32D may be collectively referred to as an emission surface 32, and the side surfaces 33A to 33D may be collectively referred to as a side surface 33, in some cases. The incident surfaces 31A to 31D are surfaces which face the display surfaces 21A to 21D and on which the image light beams L1 to L4 from the display surfaces 21A to 21D are incident, respectively. The emission surfaces 32A to 32D are surfaces which are positioned on sides opposite to the incident surfaces 31A to 31D and from which the image light beams L1 to L4 having passed through the interior of the fiber optical plates 30A to 30D are emitted. The side surfaces 33A to 33D are surfaces which connect, respectively, the incident surfaces 31A to 31D and the emission surfaces 32A to 32D together. It is to be noted that all of the emission surfaces 32A to 32D in the fiber optical plates 30A to 30D may favorably be at the same height position. That is, in a case where the height position of the surface 10S of the substrate 10 is set as the reference position, all of the emission surfaces 32A to 32D may favorably be at a position of a height H30.

FIG. 2A is an enlarged cross-sectional view of an optional display unit U which is a main part of the display device 1. In addition, FIG. 2B is an enlarged plan view of a main part of the fiber optical plate 30. As illustrated in FIGS. 2A and 2B, the plurality of optical fibers 34 each include a core part 341 that guides image light L (L1 to L4) from the incident surface 31 to the emission surface 32, and a cladding part 342 that surrounds the core part 341 in the X-Y plane. Each of the core parts 341 has an optical axis OX inclined to all of the incident surface 31, the emission surface 32, and a Z-axis. However, the core parts 341 of the plurality of optical fibers 34 in the fiber optical plate 30A have respective optical axes OX inclined in substantially the same direction. Accordingly, the core parts 341 of the plurality of optical fibers 34 that configure the fiber optical plate 30A extend substantially parallel to one another. The respective optical axes OX of the plurality of optical fibers 34 in the fiber optical plates 30B to 30D are also similar to those in the fiber optical plate 30A. The image light beams L1 to L4 travel inside the fiber optical plates 30A to 30D, respectively, along their arrow directions, i.e., along the respective optical axes OX in the fiber optical plates 30A to 30D.

The fiber optical plates 30A to 30D each have, for example, substantially a parallelogram shape in a cross-section including the Z-axis as illustrated in FIG. 1B. For this reason, all of the side surfaces 33A to 33D of the fiber optical plates 30A to 30D are inclined relative to the Z-axis. In the display device 1, however, the side surfaces 33A to 33D are inclined toward a center position CP (FIG. 1A) as being away from the display surfaces 21A to 21D in the Z-axis direction. Each of the optical axes OX of the plurality of optical fibers 34 in the fiber optical plate 30A extends in a direction along a traveling direction of image light L1 illustrated in FIGS. 1A and 1B, for example. Each of the optical axes OX of the plurality of optical fibers 34 in the fiber optical plate 30B extends in a direction along a traveling direction of image light L2 illustrated in FIGS. 1A and 1B, for example. Each of the optical axes OX of the plurality of optical fibers 34 in the fiber optical plate 30C extends in a direction along a traveling direction of image light L3 illustrated in FIGS. 1A and 1B, for example. Each of the optical axes OX of the plurality of optical fibers 34 in the fiber optical plate 30D extends in a direction along a traveling direction of image light L4 illustrated in FIGS. 1A and 1B, for example.

Specifically, as illustrated in FIG. 1B, for example, in the vicinity of the gap G12 across which the fiber optical plate 30A and the fiber optical plate 30B face each other, the side surface 33A is inclined to be closer to the side surface 33B facing the side surface 33A, as being toward its upper end position UP1 from its lower end position LP1. That is, the side surface 33A protrudes outward to overhang a portion of the gap G12. Meanwhile, the side surface 33B projects outward to be closer to the side surface 33A, i.e., to overhang another portion of the gap G12, as being toward its upper end position UP2 from its lower end position LP2. In this manner, at a boundary position K12, a distance between the lower end position LP1 and the lower end position LP2 is larger than a distance between the upper end position UP1 and the upper end position UP2. Here, the upper end position UP1 of the side surface 33A and the upper end position UP2 of the side surface 33B desirably abut each other. The lower end position LP1 is also an edge position of the incident surface 31A, and the lower end position LP2 is also an edge position of the incident surface 31B. In addition, the upper end position UP1 is also an edge position of the emission surface 32A, and the upper end position UP2 is also an edge position of the emission surface 32B. Accordingly, a distance between the position of the image light L1 at the time of emission from the emission surface 32A and the position of the image light L2 at the time of emission from the emission surface 32B is closer than a distance between the position of the image light L1 at the time of incidence on the incident surface 31A and the position of the image light L2 at the time of incidence on the incident surface 31B.

In addition, for example, also in the vicinity of the gap G34 across which the fiber optical plate 30C and the fiber optical plate 30D face each other, the side surface 33C is inclined to be closer to the side surface 33D facing the side surface 33C, as being toward its upper end position UP3 from its lower end position LP3. That is, the side surface 33C protrudes outward to overhang a portion of the gap G34. Meanwhile, the side surface 33D protrudes outward to be closer to the side surface 33C, i.e., to overhang another portion of the gap G34, as being toward its upper end position UP4 from its lower end position LP4. In this manner, also in a boundary position K34, a distance between the lower end position LP3 and the lower end position LP4 is larger than a distance between the upper end position UP3 and the upper end position UP4. Here, the upper end position UP3 of the side surface 33C and the upper end position UP4 of the side surface 33D desirably abut each other. The lower end position LP3 is also an edge position of the incident surface 31C, and the lower end position LP4 is also an edge position of the incident surface 31D. In addition, the upper end position UP3 is also an edge position of the emission surface 32C, and the upper end position UP4 is also an edge position of the emission surface 32D. Accordingly, a distance between the position of the image light L3 at the time of emission from the emission surface 32C and the position of the image light L4 at the time of emission from the emission surface 32D is closer than a distance between the position of the image light L3 at the time of incidence on the incident surface 31C and the position of the image light L4 at the time of incidence on the incident surface 31D.

Furthermore, the same applies to the vicinity of the gap G23 and the vicinity of the gap G41. That is, for example, in the vicinity of the gap G23, the side surface 33B and the side surface 33C facing each other in the Y-axis direction are inclined to be closer to each other and overhang the gap G23, as being away from the incident surface 31B and the incident surface 31C, respectively. Accordingly, a distance between the position of the image light L2 at the time of emission from the emission surface 32B and the position of the image light L3 at the time of emission from the emission surface 32C is closer than a distance between the position of the image light L2 at the time of incidence on the incident surface 31B and the position of the image light L3 at the time of incidence on the incident surface 31C. In addition, in the vicinity of the gap G41, the side surface 33A and the side surface 33D facing each other in the Y-axis direction are inclined to be closer to each other and overhang the gap G41, as being away from the incident surface 31A and the incident surface 31D, respectively. Accordingly, a distance between the position of the image light L1 at the time of emission from the emission surface 32A and the position of the image light L4 at the time of emission from the emission surface 32D is closer than a distance between the position of the image light L1 at the time of incidence on the incident surface 31A and the position of the image light L4 at the time of incidence on the incident surface 31D.

The fiber optical plates 30A to 30D have, respectively, the emission surfaces 32A to 32D on sides opposite to the display surfaces 21A to 21D from which the image light beams L1 to L4 are emitted. The emission surface 32A and the emission surface 32B abut each other at the boundary position K12. The emission surface 32B and the emission surface 32C abut each other at a boundary position K23. The emission surface 32C and the emission surface 32D abut each other at the boundary position K34. The emission surface 32D and the emission surface 32A abut each other at a boundary position K41. In this manner, the emission surfaces 32A to 32D form one rectangle-shaped coupled image light emission surface as a whole. The single coupled image light emission surface formed by these emission surfaces 32A to 32D covers the gap G.

FIG. 3A is an enlarged cross-sectional view of one configuration example of the vicinity of the side surface 33A of the fiber optical plate 30A and the side surface 33B of the fiber optical plate 30B facing each other with the gap G12 interposed therebetween. In addition, FIG. 3B is an enlarged cross-sectional view of another configuration example of the vicinity of the side surface 33A of the fiber optical plate 30A and the side surface 33B of the fiber optical plate 30B facing each other with the gap G12 interposed therebetween.

In the one configuration example illustrated in FIG. 3A, an inclination angle θ31A formed by an optical axis OX1 of the core part 341 and the incident surface 31A in the fiber optical plate 30A is smaller than an inclination angle θ33A formed by the side surface 33A and the incident surface 31A (θ31A<θ33A). In addition, an inclination angle θ32A formed by the optical axis OX1 of the core part 341 and the emission surface 32A in the fiber optical plate 30A is also smaller than the inclination angle θ33A formed by the side surface 33A and the emission surface 32A (θ32A<θ33A). The same applies to the fiber optical plate 30B. In the one configuration example illustrated in FIG. 3A, an inclination angle θ31B formed by an optical axis OX2 of the core part 341 and the incident surface 31B in the fiber optical plate 30B is smaller than an inclination angle θ33B formed by the side surface 33B and the incident surface 31B (θ31B<θ33B). In addition, an inclination angle θ32B formed by the optical axis OX2 of the core part 341 and the emission surface 32B in the fiber optical plate 30B is also smaller than the inclination angle θ33B formed by the side surface 33B and the emission surface 32B (θ32B<θ33B). Accordingly, even when a core part 341 exposed to the emission surface 32 in the vicinity of the upper end positions UP1 and UP2 is included among the plurality of optical fibers 34, the core part 341 is also exposed to the incident surface 31. Accordingly, the image light L is also emitted from the emission surface 32 in the vicinity of the upper end positions UP1 and UP2.

Meanwhile, in one configuration example illustrated in FIG. 3B, the inclination angle θ31A formed by the optical axis OX1 of the core part 341 and the incident surface 31A in the fiber optical plate 30A is larger than the inclination angle θ33A formed by the side surface 33A and the incident surface 31A (θ31A>θ33A). In addition, the inclination angle θ32A formed by the optical axis OX1 of the core part 341 and the emission surface 32A in the fiber optical plate 30A is also larger than the inclination angle θ33A formed by the side surface 33A and the emission surface 32A (θ32A>θ33A). The same applies to the fiber optical plate 30B. In the one configuration example illustrated in FIG. 3B, the inclination angle θ31B formed by the optical axis OX2 of the core part 341 and the incident surface 31B in the fiber optical plate 30B is larger than the inclination angle θ33B formed by the side surface 33B and the incident surface 31B (θ31B>θ33B). In addition, the inclination angle θ32B formed by the optical axis OX2 of the core part 341 and the emission surface 32B in the fiber optical plate 30B is also larger than the inclination angle θ33B formed by the side surface 33B and the emission surface 32B (θ32B>θ33B). Accordingly, there may possibly be an optical fiber 34 that includes a core part 341 exposed to the emission surface 32 but not exposed to the incident surface 31, among those, of the plurality of optical fibers 34, positioned in the vicinity of the upper end positions UP1 and UP2. Accordingly, in the one configuration example illustrated in FIG. 3B, there may possibly be a region, of the emission surface 32, where the image light L is not emitted in the vicinity of the upper end positions UP1 and UP2.

(Optical Film 40)

The optical films 40A to 40D are arranged along the emission surfaces 32A to 32D to correspond to the fiber optical plates 30A to 30D, respectively. The optical films 40A to 40D are optical members that are provided on sides opposite to the display panels 20A to 20D as viewed from the fiber optical plates 30A to 30D and convert light distribution of the image light beams L1 to L4 emitted from the emission surfaces 32A to 32D. The optical films 40A to 40D function to change traveling directions of the image light beams L1 to L4 emitted from the fiber optical plates 30A to 30D, respectively, while transmitting the image light beams L1 to L4, and to make conversion into light distribution that is uniform luminance distribution as viewed from a front direction, for example. The optical films 40A to 40D may favorably have a refractive index smaller than a refractive index of the core part 341 of the optical fiber 34 and larger than one. This is to reduce propagation loss at the time when the image light beams L1 to L4 emitted from the emission surfaces 32A to 32D of the fiber optical plates 30A to 30D are incident on the optical films 40A to 40D and thus to ensure high transmission efficiency.

The optical film 40 includes, for example, two or more light-transmissive layers having different refractive indices. FIG. 4 is a cross-sectional view of one configuration example of the optical film 40. The optical film 40 has a structure in which, as illustrated in FIG. 4, for example, a high refractive layer 411 having an incident surface 41 facing the emission surface 32 and a low refractive layer 412 having an emission surface 42 positioned on side opposite to the emission surface 32 as viewed from the high refractive layer 411 are joined with an interface 40K interposed therebetween. A refractive index of the high refractive layer 411 is higher than a refractive index of the low refractive layer 412. However, the high refractive layer 411 and the low refractive layer 412 may both favorably have a refractive index smaller than the refractive index of the core part 341 of the optical fiber 34 and larger than one. The interface 40K forms, for example, a saw-blade shape including an inclined surface inclined relative to the Z-axis, in a cross-section including a traveling direction of the image light L. Accordingly, as illustrated in FIG. 4, image light LL from the emission surface 32, which has entered the incident surface 41 from a direction different from the Z-axis, is deflected in a +Z direction, which is a front direction, at the interface 40K, and is emitted from the emission surface 42 as image light Lout. It is to be noted that, as illustrated in FIG. 1B, all of the emission surfaces 42A to 42D may favorably be at the same height position. That is, in a case where the height position of the surface 10S of the substrate 10 is set as the reference position, all of the emission surfaces 42A to 42D may favorably be at a position of a height H40.

The display device 1 may favorably further include, between the optical film 40 and the emission surface 32 of the fiber optical plate 30, an adhesive layer 61 (FIG. 2A) that transmits the image light L and has a refractive index equal to or less than the refractive index of the core part 341 of the optical fiber 34 and larger than the refractive index of the optical film 40. This is to further reduce propagation loss at the time when the image light L emitted from the emission surface 32 of the fiber optical plate 30 is incident on the optical film 40 and thus to ensure higher transmission efficiency. Further, as illustrated in FIG. 2A, an adhesive layer 62 may favorably be provided which transmits the image light L and has a refractive index equal to or less than the refractive index of the core part 341 of the optical fiber 34, between the display panel 20 and the fiber optical plate 30. This is to further reduce propagation loss at the time when the image light L emitted from the display panel 20 is incident on the fiber optical plate 30 and thus to ensure higher transmission efficiency.

[Workings and Effects of Display Device 1]

Next, description is given of a path of propagation of the image light L in the display device 1 illustrated in FIG. 1A, with reference to FIG. 5A. FIG. 5A is a cross-sectional view that conceptually describes a state of propagation of the image light L in the display device 1. In the display device 1, a desired image is displayed on the display panel 20, and the image light L is emitted from a display surface 21. In the present specification and the drawings, the image light L in a stage of being emitted from the display surface 21 is referred to as image light L0 for the purpose of convenience. The image light L0 enters the incident surface 31 of the fiber optical plate 30, and thereafter propagates along the optical axis OX inside the core part 341 of the optical fiber 34. In the present specification and the drawings, the image light L propagating inside the core part 341 of the optical fiber 34 is referred to as image light LL for the purpose of convenience. It is to be noted that, when the image light L0 enters the incident surface 31 of the fiber optical plate 30, loss of a light amount occurs due to reflection or the like. In FIG. 5A, a difference between a light amount of the image light L0 and a light amount of the image light LL is represented by thicknesses of respective arrows. The image light LL is emitted from the emission surface 32, and thereafter enters the incident surface 41 of the optical film 40. The image light LL is subjected to conversion of light distribution in the optical film 40, and adjusted to have a uniform luminance distribution as viewed from the front direction, for example, to be emitted as an image light Lout from the emission surface 42.

Meanwhile, FIG. 5B is a conceptual diagram that describes a state of propagation of image light in a display device provided with a fiber optical plate 130 as a reference example. The fiber optical plate 130 is provided with an optical fiber 134 that includes a core part 1341 and a cladding part 1342, but is not provided with the optical film 40. Accordingly, the image light LL propagating along the optical axis OX inside the core part 341 of the optical fiber 134 is emitted as it is as the image light Lout from the emission surface 32. The optical axis OX of the core part 341 of the optical fiber 134 is inclined relative to the Z-axis, and thus the image light Lout has a biased luminance distribution relative to the Z-axis. Moreover, a refractive index of the core part 1341 and a refractive index of air largely differ, and thus reflection at the emission surface 32 occurs strongly. Accordingly, as compared with the display device 1 of the present embodiment, loss of a light amount is large, thus lowering luminance itself.

In this manner, in the display device 1 of the present embodiment, the optical film 40 is provided on side opposite to the display panel 20 as viewed from the fiber optical plate 30, and the optical film 40 allows for conversion of light distribution of the image light L emitted from the emission surface 32. This makes it possible to emit the image light Lout having been adjusted to have a uniform luminance distribution as viewed from a desired direction, e.g., the front direction. In addition, providing the optical film 40 makes it possible to reduce the loss of a light amount, and thus to achieve improvement in luminance of the image light Lout.

In addition, allowing the refractive indices of the optical films 40A to 40D to be smaller than the refractive index of the core part 341 of the optical fiber 34 and larger than one makes it is possible to further reduce the propagation loss of the image light L and to ensure higher transmission efficiency.

Further, allowing the display device 1 to further include the adhesive layer 61 between the optical film 40 and the emission surface 32 of the fiber optical plate 30 makes it possible to further reduce the propagation loss at the time of incidence of the image light L on the optical film 40 and thus to ensure higher transmission efficiency.

Further, in the display device 1, the emission surfaces 32A to 32D in the fiber optical plates 30A to 30D are coupled together with no gap to form one rectangle-shaped coupled image light emission surface as a whole. That is, the single coupled image light emission surface formed by the emission surfaces 32A to 32D covers the gap G between the display panels 20. Therefore, it is possible to form an image display surface having a larger display area which is difficult for a viewer to recognize a seam, thus making it possible to provide the viewer with a screen image which is larger and superior in an aesthetic property.

Further, in the display device 1, by allowing the inclination angle θ31 and the inclination angle θ32 formed by the optical axis OX of the core part 341 and the incident surface 31 and the emission surface 32 in the fiber optical plate 30 to be smaller than the inclination angle θ33 formed by the side surface 33 and the incident surface 31, it is possible to prevent loss of the image light L in the vicinity of the boundary position between the emission surfaces 32.

2. Modification Example of First Embodiment

[Configuration of Display Device 1A]

FIG. 6 is a cross-sectional view of an overall configuration of a display device 1A as a modification example of the foregoing first embodiment, and corresponds to FIG. 1B of the foregoing first embodiment. In addition, FIG. 7 is an enlarged cross-sectional view of a main part of the display device 1A, and corresponds to FIG. 2A of the foregoing first embodiment.

As illustrated in FIGS. 6 and 7, the display device 1A of the present modification example further includes an optical film 50 as a second optical member that deflects the image light L emitted from the display surface 21, between the display surface 21 of the display panel 20 and the incident surface 31 of the fiber optical plate 30. The optical film 50 transmits the image light L, and has a refractive index smaller than the refractive index of the core part 341 and larger than one.

FIG. 8 is a cross-sectional view of one configuration example of the optical film 50. As illustrated in FIG. 8, the optical film 50 has a structure in which, for example, a low refractive layer 512 having an incident surface 51 facing the display surface 21 and a high refractive layer 511 having an emission surface 52 positioned on side opposite to the display surface 21 as viewed from the low refractive layer 512 are joined with an interface 50K interposed therebetween. A refractive index of the high refractive layer 511 is higher than a refractive index of the low refractive layer 512. However, the high refractive layer 511 and the low refractive layer 512 may both favorably have a refractive index smaller than the refractive index of the core part 341 of the optical fiber 34 and larger than one. In a cross-section including a traveling direction of the image light L, the interface 50K has a saw-blade shape including an inclined surface inclined relative to the Z-axis, for example. Accordingly, as illustrated in FIG. 8, the image light L0 from the display surface 21, having entered the incident surface 51 from the Z-axis direction, is deflected in a direction inclined from the Z-axis at the interface 50K, and is emitted as image light Lin from the emission surface 52.

[Workings and Effects of Display Device 1A]

Next, description is given of a path of propagation of the image light L in the display device 1A illustrated in FIG. 6, with reference to FIG. 9. FIG. 9 is a cross-sectional view that conceptually describes a state of propagation of the image light L in the display device 1A, and corresponds to FIG. 5A of the foregoing first embodiment. In the display device 1, a desired image is displayed on the display panel 20, and the image light L is emitted from the display surface 21. In the present specification and the drawings, the image light L in a stage of being emitted from the display surface 21 is referred to as the image light L0 for the purpose of convenience. The image light L0 enters the incident surface 51 of the optical film 50, and is thereafter emitted as the image light Lin from the emission surface 52. The image light Lin is inclined relative to the Z-axis to be closer to the optical axis OX, thus reducing the loss of a light amount due to reflection or the like at the time of incidence of the image light Lin on the incident surface 31 of the fiber optical plate 30.

In this manner, the display device 1A as the present modification example is further provided with the optical film 50 on incident side of the fiber optical plate 30, thus making it possible, as compared with the display device 1, to further reduce the loss of a light amount and thus to achieve improvement in luminance of the image light Lout.

It is to be noted that, as illustrated in FIG. 7, the display device 1A may favorably include, between the display panel 20 and the optical film 50, an adhesive layer 63 that transmits the image light L and has a refractive index equal to or less than the refractive index of the optical film 50 and larger than the refractive index of the optical film 50. This is to further reduce propagation loss at the time when the image light L emitted from the display panel 20 is incident on the optical film 50 and thus to ensure higher transmission efficiency.

3. Second Embodiment

[Configuration of Display Device 2]

FIG. 10 is a cross-sectional view of an overall configuration example of a display device 2 according to a second embodiment of the present disclosure, and corresponds to FIG. 1B illustrating a cross-sectional configuration of the display device 1 according to the foregoing first embodiment. In each of the display devices 1 and 1A of the foregoing first embodiment, the optical film 40 is disposed to face the emission surface 32 of the fiber optical plate 30. In contrast, in the display device 2 of the present embodiment, another fiber optical plate 70 is disposed in place of the optical film 40. That is, in the display device 2, as illustrated in FIG. 10, the fiber optical plate 30 as a first light guide member and the fiber optical plate 70 as a second light guide member are stacked in the Z-axis direction. Except for this point, the display device 2 has substantially the same configuration as that of the display device 1A as the modification example of the foregoing first embodiment, and thus description is given here mainly of the fiber optical plate 70. As illustrated in FIG. 10, the fiber optical plate 70 is disposed on the side opposite to the display panel 20 as viewed from the fiber optical plate 30.

FIG. 11 is a cross-sectional view of one configuration example of the fiber optical plate 70 used in the display device 2. As illustrated in FIGS. 10 and 11, the fiber optical plate 70 is a plate-like member in which a plurality of optical fibers 73 are bundled and integrated, and has incident surfaces 71A to 71D and emission surfaces 72A to 72D. In the descriptions of the present specification and the drawings, the incident surfaces 71A to 71D may be collectively referred to as an incident surface 71, and the emission surfaces 72A to 72D may be collectively referred to as an emission surface 72, in some cases. The incident surfaces 71A to 71D are surfaces which face the emission surfaces 32A to 32D of the fiber optical plates 30A to 30D and on which the image light beams L1 to L4 from the emission surfaces 32A to 32D are incident, respectively. The emission surfaces 72A to 72D are surfaces which are positioned on sides opposite to the incident surfaces 71A to 71D and from which the image light beams L1 to L4 having passed through the interior of the fiber optical plates 70A to 70D are emitted. The plurality of optical fibers 73 each include a core part 731 that guides the image light L from the incident surface 71 to the emission surface 72, and a cladding part 732 that surrounds the core part 731 in the X-Y plane. Here, an optical axis OX34 of the core part 341 in the optical fiber 34 of the fiber optical plate 30 forms a first angle θ34 that is larger than 0° and less than 90° relative to the display surface 21 of the display panel 20, i.e., the X-Y plane. Meanwhile, an optical axis OX73 of the core part 731 in the optical fiber 73 of fiber optical plate 70 may favorably form a second angle θ73 that is larger than the first angle θ34 and equal to or less than 90° relative to the display surface 21 of the display panel 20, i.e., the X-Y plane. In particular, the optical axis OX73 of the core part 731 may favorably be substantially parallel to the Z-axis direction, for example.

[Workings and Effects of Display Device 2]

In this manner, in the display device 2 of the present embodiment, the fiber optical plate 70 is provided on the side opposite to the display panel 20 as viewed from the fiber optical plate 30. Thus, as illustrated in FIG. 11, the fiber optical plate 70 makes it possible to convert light distribution of the image light LL emitted from the emission surface 32. Thus, it is possible to emit the image light Lout having been adjusted to have uniform luminance distribution as viewed from a desired direction, e.g., the front direction. In addition, providing the fiber optical plate 70 makes it possible to reduce the loss of a light amount and thus to achieve improvement in luminance of the image light Lout.

4. Other Modification Examples

Although the description has been given above of the present disclosure with reference to several embodiments and the modification examples, the present disclosure is not limited to the foregoing embodiments, etc., and may be modified in a wide variety of ways. For example, in the optical film 40 as the first optical member in the display device 1 of the foregoing first embodiment, the high refractive layer 411 is disposed on side of incidence of the image light L, and the low refractive layer 412 is disposed on side of emission of the image light L. However, in the present disclosure, any of optical films 43 to 45 illustrated, respectively, in FIGS. 12A to 12C, for example, may be used as the first optical member. The optical film 43 illustrated in FIG. 12A has a structure in which the low refractive layer 412 having the incident surface 41 facing the emission surface 32 and the high refractive layer 411 including the emission surface 42 positioned on the side opposite to the emission surface 32 as viewed from the low refractive layer 412 are joined with an interface 43K interposed therebetween, which is inclined relative to the Z-axis. The optical film 44 illustrated in FIG. 12B has a structure in which the high refractive layer 411 having the incident surface 41 facing the emission surface 32 and the low refractive layer 412 including the emission surface 42 positioned on the side opposite to the emission surface 32 as viewed from the high refractive layer 411 are joined with an interface 44K interposed therebetween, which includes a curved surface convex to the incident side. In addition, the optical film 45 illustrated in FIG. 12C has a structure in which the low refractive layer 412 having the incident surface 41 facing the emission surface 32 and the high refractive layer 411 including the emission surface 42 positioned on the side opposite to the emission surface 32 as viewed from the low refractive layer 412 are joined with an interface 45K interposed therebetween, which includes a curved surface convex to the emission side. Also in a case of using each of these optical films 43 to 45, it is possible to convert the light distribution of the image light LL emitted from the emission surface 32. Thus, it is possible to emit the image light Lout having been adjusted to have a uniform luminance distribution as viewed from a desired direction, e.g., the front direction. In addition, providing each of the optical films 43 to 45 makes it possible to reduce the loss of a light amount and thus to achieve improvement in luminance of the image light Lout.

In addition, in the foregoing embodiments, etc., the four display units U are arranged in two rows and two columns; however, the present disclosure is not limited thereto. For example, as in a display device 3 as a fifth modification example of the present disclosure illustrated in FIG. 13, nine display units U1 to U9 may be arranged in three rows and three columns. That is, in the display device 3, as illustrated in FIG. 13, the display units U1 to U3 arrayed in order in the X-axis direction, the display units U4 to U6 arrayed in order in the X-axis direction, and the display units U7 to U9 arrayed in order in the X-axis direction are disposed in order to be adjacent to each other in the Y-axis direction. In the display device 3, emission surfaces 32A to 32I of the respective fiber optical plates 30 of the display units U1 to U9 form a single coupled image light emission surface, to thereby substantially cover gaps G12, G23, G34, G45, G56, G67, G78, and G89. In the display device 3, image light beams L1 to L4 and L6 to L9 propagating through the respective fiber optical plates 30 of the display units U1 to U4 and U6 to U9 are shifted in respective directions of arrows illustrated in FIG. 13. That is, the image light beams L1 to L4 and L6 to L9 transmitted through the respective fiber optical plates 30 of the display units U1 to U4 and U6 to U9 are shifted to converge on the display unit U5 positioned at the entire center. The image light L5 transmitted through the fiber optical plate 30 of the display unit U5 travels directly upward, i.e., in the +Z-direction.

In addition, in the foregoing embodiments, etc., the fiber optical plates in the respective display units emit images incident from the incident surfaces, from the emission surfaces with their sizes remaining constant; however, the present disclosure is not limited thereto. For example, as in the fiber optical plates 70 (70A and 70B) of a display device 4 as a sixth modification example of the present disclosure illustrated in FIGS. 14A to 14C, images incident from the incident surfaces 71 (71A and 71B) may be expanded to be emitted from the emission surfaces 72 (72A and 72B). FIG. 14A is a front view of an overall configuration example of the display device 4. FIG. 14B illustrates a cross-sectional configuration example of the fiber optical plate 70, and corresponds to a cross-section in an arrow view direction taken along a cutting line XIVB-XIVB illustrated in FIG. 14A, for example.

The fiber optical plate 70A and the fiber optical plate 70B are adjacent to each other in the X-axis direction to face each other at the boundary position K12. The fiber optical plates 70A and 70B have the incident surfaces 71A and 71B, on which the image light beams L1 and L2 from the display panels 20A and 20B are respectively incident, and the emission surfaces 72A and 72B, from which the image light beams L1 and L2 transmitted through their own interiors are emitted respectively. Further, the fiber optical plates 70A and 70B have side surfaces 73A and 73B, which face each other at the boundary position K12, and side surfaces 74A and 74B, which are positioned on sides opposite to the boundary position K12. In the boundary position K12, an emission part 78 (described later) of the fiber optical plate 70A and the emission part 78 (described later) of the fiber optical plate 70B desirably abut each other.

As illustrated in FIG. 14B, the emission surfaces 72A and 72B of the fiber optical plates 70A and 70B may further be provided with an optical member 80 such as a low-reflection film, for example. The optical member 80 may favorably be adhered to the emission surfaces 72A and 72B of the fiber optical plates 70A and 70B by adhesive layers 61A and 61B, for example. In addition, the incident surfaces 71A and 71B of the fiber optical plates 70A and 70B may favorably be adhered to the display panels 20A and 20B by adhesive layers 62A and 62B, for example.

Further, FIG. 14C is an enlarged cross-sectional view schematically illustrating details of the fiber optical plate 70. It is to be noted that the fiber optical plate 70A and the fiber optical plate 70B have substantially the same structure, and thus description is given without making a distinction from each other. The fiber optical plate 70 is an integration of a plurality of optical fibers 75 being bundled, and includes an incident part 76, an intermediate part 77, and the emission part 78 in order in a direction from the incident surface 71 toward the emission surface 72. The plurality of optical fibers 75 each have a core part 751 and a cladding part 752 that surrounds a circumference of the core part 751. An optical axis in each of the incident part 76 and the emission part 78 is substantially parallel to the front direction, i.e., the Z-axis direction. In contrast, in the intermediate part 77, the optical axis is inclined relative to the Z-axis. In the intermediate part 77, as being closer to the side surface 74, the optical axis becomes more parallel to the Z-axis direction, whereas, as being closer to a side surface 73 opposed to the boundary K12, the optical axis is away from the Z-axis direction, i.e., an angle formed by the optical axis relative to the Z-axis direction is enlarged. Accordingly, a traveling direction of the image light L propagating through the intermediate part 77 is inclined more largely relative to the Z-axis direction, as being closer to the side surface 73 from the side surface 74. It is to be noted that FIG. 14A schematically illustrates traveling directions of image light beams L1-1 and L2-1 propagating through an optical fiber 75-1 (FIG. 14C) positioned closest to the side surface 64 as well as traveling directions of image light beams L1-2 and L2-2 propagating through an optical fiber 75-2 (FIG. 14C) positioned closest to the side surface 64. In addition, the core part 751 of the optical fiber 75 has a core diameter which gradually enlarges toward emission side from incident side, in the intermediate part 77. Accordingly, the image light L propagating through the intermediate part 77 gradually expands as being closer to the emission part 78. The core diameter of the core part 751 in the incident part 76 and the core diameter of the core part 751 in the emission part 78 are both constant, for example. However, the core diameter of the core part 751 in the emission part 78 is larger than the core diameter of the core part 751 in the incident part 76.

In this manner, according to the present modification example, images incident from the incident surfaces 71 (71A and 71B) are expanded and emitted from the emission surfaces 72 (72A and 72B) in the fiber optical plates 70 (70A and 70B). This makes it possible to form a display surface larger than an area occupied by the display panel 20A and the display panel 20B, while hiding, from a viewer, the gap G12 between the display unit U1 and the display unit U2. In addition, the emission part 78 has an optical axis along the Z-axis direction, thus allowing the image light beams L1 and L2 to be distributed in the front direction, which achieves superior image-display performance.

In addition, the fiber optical plate 70 of the display device 4 illustrated in FIGS. 14A to 14C includes the incident part 76, the intermediate part 77, and the emission part 78 in order; however, the present disclosure is not limited thereto. For example, as in a display device 4A as a seventh modification example of the present disclosure illustrated in FIG. 15, the fiber optical plate 70 may have a structure without the incident part 76, out of the incident part 76, the intermediate part 77, and the emission part 78.

In addition, the foregoing embodiments, etc. exemplify the case where the shapes and sizes of respective components of the plurality of display units U are substantially the same; however, the present disclosure is not limited thereto. In the present disclosure, the shapes and sizes of the respective components of the plurality of display units U may be partially or entirely different.

It is to be noted that the effects described herein are merely exemplary and are not limited thereto, and may have other effects. In addition, the present technology may have the following configurations.

(1)

A display device including:

a display section including a display surface that emits image light;

a light guide member in which a plurality of optical fibers each including a core part and a cladding part are bundled and integrated, the core part guiding the image light from an incident surface facing the display surface to an emission surface positioned opposite to the incident surface, the cladding part surrounding the core part; and a first optical member provided on side opposite to the display section as viewed from the light guide member, the first optical member converting light distribution of the image light emitted from the emission surface.

(2)

The display device according to (1), in which the first optical member transmits the image light and has a refractive index smaller than a refractive index of the core part and larger than one.

(3)

The display device according to (2), further including, between the first optical member and the emission surface, a first adhesive layer that transmits the image light and has a refractive index equal to or less than the refractive index of the core part and larger than the refractive index of the first optical member.

(4)

The display device according to any one of (1) to (3), further including, between the display surface of the display section and the incident surface of the light guide member, a second optical member that deflects the image light emitted from the display surface.

(5)

The display device according to (4), in which the second optical member transmits the image light and has a refractive index smaller than a refractive index of the core part and larger than one.

(6)

The display device according to (5), further including, between the second optical member and the incident surface, a second adhesive layer that transmits the image light and has a refractive index equal to or less than the refractive index of the core part and larger than the refractive index of the second optical member.

(7)

The display device according to any one of (1) to (6), in which the first optical member includes two or more light-transmissive layers having refractive indices different from each other.

(8)

The display device according to any one of (4) to (6), in which the second optical member includes two or more light-transmissive layers having refractive indices different from each other.

(9)

The display device according to any one of (1) to (8), including a plurality of the light guide members arranged along the display surface.

(10)

The display device according to (9), including a plurality of the display sections arranged along the display surface.

(11)

The display device according to (10), including:

as the plurality of the display sections, a first display section and a second display section adjacent to each other with a first gap interposed therebetween; and as the plurality of the light guide member, a first light guide member including the incident surface facing the display surface in the first display section and a second light guide member including the incident surface facing the display surface in the second display section, in which a plurality of the core parts in the first light guide member each have a first optical axis inclined relative to both of the incident surface and the emission surface, a plurality of the core parts in the second light guide member each have a second optical axis inclined relative to both of the incident surface and the emission surface, and a first distance between an edge position of the incident surface in the first light guide member and an edge position of the incident surface in the second light guide member is larger than a second distance between an edge position of the emission surface in the first light guide member and an edge position of the emission surface in the second light guide member, at a boundary position between the first light guide member and the second guide member.

(12)

The display device according to (11), in which a first image light emission surface including the emission surface in the first light guide member and a second image light emission surface including the emission surface in the second light guide member are adjacent to each other to form a single coupled image light emission surface.

(13)

The display device according to (12), in which the first gap is covered with the single coupled image light emission surface.

(14)

The display device according to any one of (1) to (13), in which a first inclination angle formed by an optical axis of the core part and the incident surface and a second inclination angle formed by the optical axis of the core part and the emission surface are smaller than a third inclination angle formed by a side surface of the light guide member and the incident surface.

(15)

A display device including:

a display section including a display surface that emits image light;

a first light guide member in which a plurality of first optical fibers each including a first core part and a first cladding part are bundled and integrated, the first core part guiding the image light from a first incident surface facing the display surface to a first emission surface positioned opposite to the first incident surface, the first cladding part surrounding the first core part; and a second light guide member which is disposed on side opposite to the display section as viewed from the first light guide member, and in which a plurality of second optical fibers each including a second core part and a second cladding part are bundled and integrated, the second core part guiding the image light from a second incident surface facing the first emission surface to a second emission surface positioned opposite to the second incident surface, the second cladding part surrounding the second core part, in which a first optical axis in the first optical fiber forms a first angle larger than 0° and less than 90° relative to the display surface, and a second optical axis in the second optical fiber forms a second angle larger than the first angle and equal to or less than 90° relative to the display surface.

(16)

An optical device including:

a light guide member in which a plurality of optical fibers each including a core part and a cladding part are bundled and integrated, the core part guiding external light from an incident surface on which the external light is incident to an emission surface positioned opposite to the incident surface, the cladding part surrounding the core part; and a first optical member disposed to face the emission surface in the light guide member, the first optical member converting light distribution of the external light emitted from emission surface.

(17)

The optical device according to (16), further including a second optical member disposed to face the emission surface in the light guide member, the second optical member deflecting the external light traveling toward the incident surface.

This application claims the benefit of Japanese Priority Patent Application JP2018-15875 filed with the Japan Patent Office on Jan. 31, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device comprising:
 a display section including a display surface that emits image light;
 a light guide member in which a plurality of optical fibers each including a core part and a cladding part are bundled and integrated, the core part guiding the image light from an incident surface facing the display surface to an emission surface positioned opposite to the incident surface, the cladding part surrounding the core part; and
 a first optical member provided on side opposite to the display section as viewed from the light guide member, the first optical member converting light distribution of the image light emitted from the emission surface,
 further comprising, between the display surface of the display section and the incident surface of the light guide member, a second optical member that deflects the image light emitted from the display surface.

2. The display device according to claim 1, wherein the second optical member transmits the image light and has a refractive index smaller than a refractive index of the core part and larger than one.

3. The display device according to claim 2, further comprising, between the second optical member and the incident surface, a second adhesive layer that transmits the image light and has a refractive index equal to or less than the refractive index of the core part and larger than the refractive index of the second optical member.

4. A display device comprising:
- a display section including a display surface that emits image light;
- a light guide member in which a plurality of optical fibers each including a core part and a cladding part are bundled and integrated, the core part guiding the image light from an incident surface facing the display surface to an emission surface positioned opposite to the incident surface, the cladding part surrounding the core part; and
- a first optical member provided on side opposite to the display section as viewed from the light guide member, the first optical member converting light distribution of the image light emitted from the emission surface,
- wherein the first optical member includes two or more light-transmissive layers having refractive indices different from each other.

5. The display device according to claim 1, wherein the second optical member includes two or more light-transmissive layers having refractive indices different from each other.

6. An optical device comprising:
- a light guide member in which a plurality of optical fibers each including a core part and a cladding part are bundled and integrated, the core part guiding external light from an incident surface on which the external light is incident to an emission surface positioned opposite to the incident surface, the cladding part surrounding the core part; and
- a first optical member disposed to face the emission surface in the light guide member, the first optical member converting light distribution of the external light emitted from emission surface,
- further comprising a second optical member disposed to face the emission surface in the light guide member, the second optical member deflecting the external light traveling toward the incident surface.

* * * * *